(12) United States Patent
Kasahara

(10) Patent No.: US 11,189,055 B2
(45) Date of Patent: Nov. 30, 2021

(54) INFORMATION PROCESSING APPARATUS AND METHOD AND PROGRAM

(71) Applicant: SONY CORPORATION, Tokyo (JP)

(72) Inventor: Shunichi Kasahara, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 65 days.

(21) Appl. No.: 16/324,723

(22) PCT Filed: Sep. 1, 2017

(86) PCT No.: PCT/JP2017/031587
§ 371 (c)(1),
(2) Date: Feb. 11, 2019

(87) PCT Pub. No.: WO2018/051815
PCT Pub. Date: Mar. 22, 2018

(65) Prior Publication Data
US 2019/0172227 A1 Jun. 6, 2019

(30) Foreign Application Priority Data

Sep. 15, 2016 (JP) .............................. JP2016-180207

(51) Int. Cl.
*G06T 7/80* (2017.01)
*H04N 5/232* (2006.01)
(Continued)

(52) U.S. Cl.
CPC ................ *G06T 7/80* (2017.01); *G03B 17/00* (2013.01); *G06F 3/01* (2013.01); *H04N 5/232* (2013.01);
(Continued)

(58) Field of Classification Search
CPC ......... G06T 7/80; G06T 11/60; G06T 3/0062; G06T 3/60; G03B 17/00; G06F 3/01;
(Continued)

(56) References Cited

U.S. PATENT DOCUMENTS 8,611,696 B1 * 12/2013 Zhu .......................... G06T 5/005
382/284
2012/0001904 A1 * 1/2012 Eymard ............... H04N 13/161
345/419
(Continued)

FOREIGN PATENT DOCUMENTS

CN 102625023 A 8/2012
JP 2006-309802 A 11/2006
(Continued)

OTHER PUBLICATIONS

WO2015122108 Rekimoto et al (surrounding images), machine translated (Year: 2015).*

*Primary Examiner* — Jianxun Yang
(74) *Attorney, Agent, or Firm* — Paratus Law Group, PLLC

(57) ABSTRACT

There is provided an information processing apparatus and method and a program that enable grasping of a missing in an image. A missing determination unit determines whether or not there is a missing portion in an image captured by a plurality of cameras, and supplies a determination result (presence or absence of a missing) to a display control unit. The display control unit controls notification according to the determination result (presence or absence of a missing). The present disclosure can be applied to, for example, a system for causing a circumference image from an image captured by a wearable terminal to be displayed in another wearable terminal.

17 Claims, 18 Drawing Sheets

(51) Int. Cl.
*G03B 17/00* (2021.01)
*G06F 3/01* (2006.01)
*H04N 21/2187* (2011.01)
*H04N 21/81* (2011.01)
*H04N 21/234* (2011.01)
*H04N 5/247* (2006.01)

(52) U.S. Cl.
CPC ..... *H04N 5/23238* (2013.01); *H04N 5/23258* (2013.01); *H04N 5/23267* (2013.01); *H04N 5/247* (2013.01); *H04N 21/2187* (2013.01); *H04N 21/23418* (2013.01); *H04N 21/816* (2013.01)

(58) Field of Classification Search
CPC .......... G06F 3/011; G06F 3/012; G06F 3/013; G06F 3/0304; G06F 3/14; H04N 5/23238; H04N 5/23258; H04N 5/23267; H04N 5/247; H04N 21/2187; H04N 21/23418; H04N 21/816; H04N 1/3935; H04N 5/23222; H04N 5/23293; H04N 5/23216; H04N 5/225; H04N 7/185; G02B 27/0093; G02B 2027/0134; G02B 2027/0178; G02B 27/017; G02B 27/0172; H04R 2499/15; H04R 5/04; H04S 7/302
See application file for complete search history.

(56) References Cited

U.S. PATENT DOCUMENTS

2012/0194636 A1* 8/2012 Tokunaga ............ H04N 1/3935
348/36
2015/0254882 A1* 9/2015 Englert ............. G02B 27/0093
345/633

FOREIGN PATENT DOCUMENTS

| JP | 2013-066247 A | 4/2013 |
| JP | 2014-057156 A | 3/2014 |
| WO | WO 2015/122108 A1 | 8/2015 |

* cited by examiner

INFORMATION PROCESSING APPARATUS AND METHOD AND PROGRAM

CROSS REFERENCE TO PRIOR APPLICATION

This application is a National Stage Patent Application of PCT International Patent Application No. PCT/JP2017/031587 (filed on Sep. 1, 2017) under 35 U.S.C. § 371, which claims priority to Japanese Patent Application No. 2016-180207 (filed on Sep. 15, 2016), which are all hereby incorporated by reference in their entirety.

TECHNICAL FIELD

The present disclosure relates to an information processing apparatus and method and a program, and in particular, to an information processing apparatus and method and a program that enable recognition of a missing in an image.

BACKGROUND ART

In recent years, in order to transmit human experience to others as it is, images of a first person viewpoint by wearable devices such as head mounted multiple cameras are used for creation of various contents or the like (see Patent Document 1). Furthermore, a system for generating an omnidirectional circumference video with a plurality of cameras has been proposed (see Patent Document 2).

CITATION LIST

Patent Document

Patent Document 1: International Publication 2015/122108
Patent Document 2: Japanese Patent Application Laid-Open No. 2006-309802

SUMMARY OF THE INVENTION

Problems to be Solved by the Invention

As described above, in a case where an image is generated using a plurality of cameras, a photographing cover range of each camera video changes due to a change in a relative positional relationship between the cameras or the like, and there is a possibility that a place for which photographing cannot be performed occurs.

The present disclosure has been made in view of such a situation, and relates to processing on images generated by imaging by a plurality of imaging devices.

Solutions to Problems

An information processing apparatus according to an aspect of the present disclosure includes: a missing determination unit that determines presence or absence of a missing in an image generated by imaging by a plurality of imaging devices; and a notification control unit that controls notification according to a determination result of presence or absence of the missing by the missing determination unit.

In an information processing method according to an aspect of the present disclosure, an information processing apparatus determines presence or absence of a missing in an image generated by imaging by a plurality of imaging devices, and controls notification according to a determination result of presence or absence of the missing.

A program according to an aspect of the present disclosure causes a computer to function as: a missing determination unit that determines presence or absence of a missing in an image generated by imaging by a plurality of imaging devices; and a notification control unit that controls notification according to a determination result of presence or absence of the missing by the missing determination unit.

In one aspect of the present disclosure, presence or absence of a missing in an image generated by imaging by a plurality of imaging devices is determined. Then, notification according to a determination result of the presence or absence of the missing is controlled.

Effects of the Invention

According to the present disclosure, a missing in an image can be grasped.

Note that the effects described herein are merely illustrative, effects of the present technology are not limited to the effects described herein, and the present technology may have additional effects.

MODE FOR CARRYING OUT THE INVENTION

Hereinafter, modes (hereinafter referred to as embodiments) for implementing the present disclosure will be described.

System Configuration Example

Figure 1:
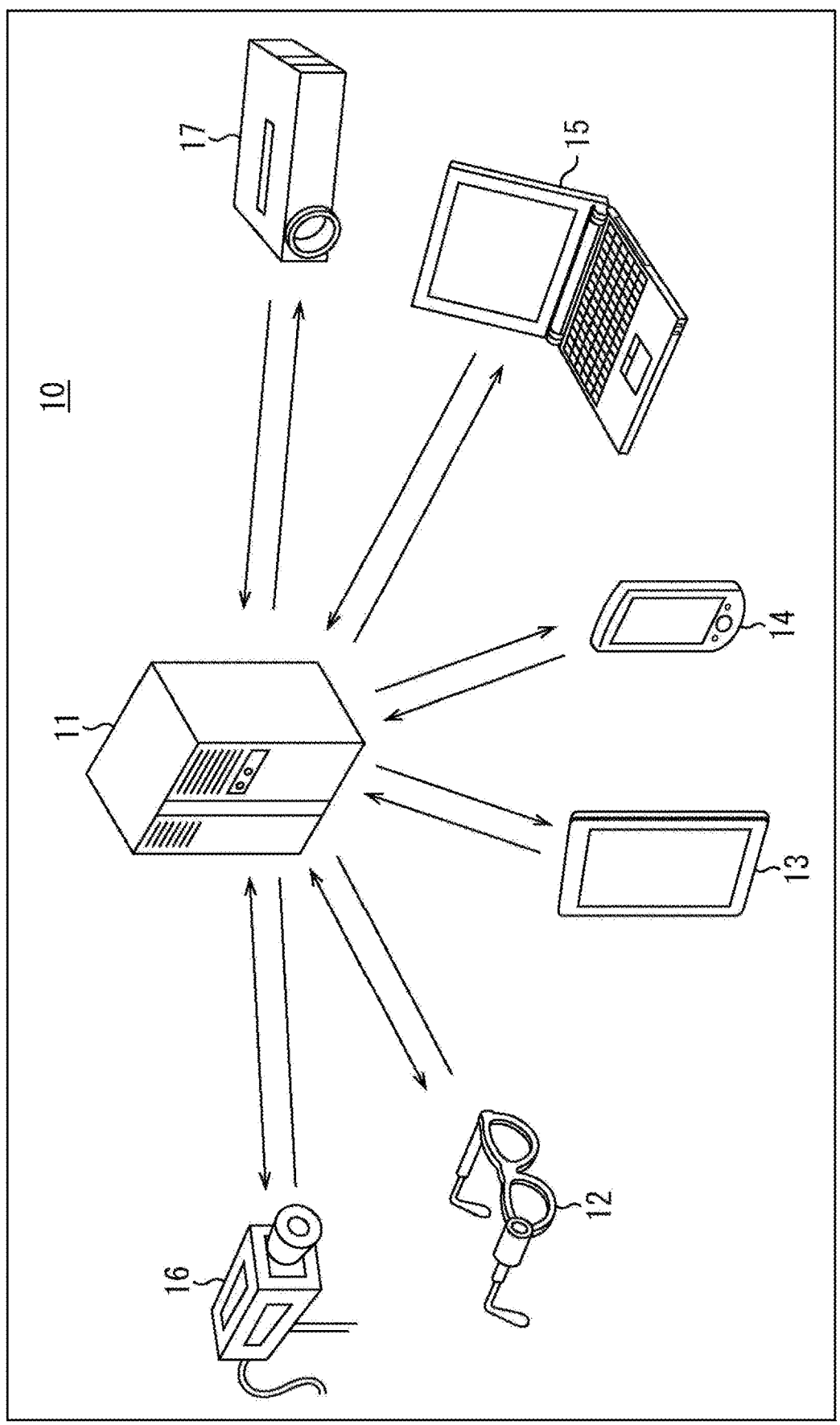
FIG. 1 is a diagram showing a schematic configuration of a system according to an embodiment of the present disclosure.

FIG. 1 is a diagram showing a schematic configuration of a system according to an embodiment of the present disclosure. As shown in FIG. 1, a system 10 in the present embodiment has a server 11 and client devices 12 to 17.

The server 11 is an aggregate of functions realized by a single server device or a plurality of server devices connected with each other by various wired or wireless networks and cooperating with each other, and provides various services to the client devices 12 to 17.

The client devices 12 to 17 are terminal devices connected to the server 11 via various wired or wireless networks.

The server 11 and the client devices 12 to 17 realize at least any of the following functions (1) to (7) in the system 10, independently or in cooperation with each other.

(1) An apparatus that has an imaging mechanism such as a camera and provides a captured image of the real space to the server 11 or other client devices 12 to 17.

(2) An apparatus that has an imaging mechanism such as a camera, performs various types of image processing on a captured image of the real space, and provides various images concerning the real space acquired by the image processing to the server 11 or other client devices 12 to 17.

(3) An apparatus that has an imaging mechanism such as a camera, performs various types of image processing on a captured image of the real space, generates an image desired by a user according to various operations on various images performed by the user, and provides the generated various images to the server 11 or other client devices 12 to 17.

(4) An apparatus that has at least a display mechanism such as a display, preferably further has an operation mechanism such as a touch panel, acquires an image provided by the apparatus of (1), generates an image desired by a user according to various operations on images performed by the user, and provides the generated various images for viewing by the user.

(5) An apparatus that has at least a display mechanism such as a display, preferably further has an operation mechanism such as a touch panel, acquires an image provided by the apparatus of (2), generates an image desired by a user according to various operations on images performed by the user, and provides the generated various images for viewing by the user.

(6) An apparatus that has at least a display mechanism such as a display, preferably further has an operation mechanism such as a touch panel, acquires an image provided by the apparatus of (3), provides the image for viewing by the user, and accepts various operations on the image by the user.

(7) An apparatus that has a display mechanism such as a display, and causes various images generated on the basis of various user operations accepted by the apparatuses (4) to (6) to be displayed.

The client device 12 is a wearable terminal (hereinafter, also simply referred to as a wearable terminal 12). The wearable terminal 12 has at least any of, for example, an imaging mechanism or a display mechanism, and functions as at least any of the above apparatuses (1) to (7). In the illustrated example, the wearable terminal 12 is of an eyeglass type, but it is not limited to this example as long as it can be worn on the user's body. In a case of functioning as the above apparatuses (1) to (3), the wearable terminal 12 has a camera installed in, for example, a frame portion of eyeglasses or the like, as an imaging mechanism. With this camera, the wearable terminal 12 can acquire an image of the real space from a position close to the user's viewpoint. The acquired image is transmitted to the server 11 or other client devices 13 to 17. Furthermore, in a case of functioning as the above apparatuses (4) to (7), the wearable terminal 12 has a display installed in, for example, a part or entirely of a lens portion of eyeglasses, as a display mechanism, or the like. The wearable terminal 12 causes the image captured by the camera to be displayed on the display.

The client device 13 is a tablet terminal (hereinafter, also simply referred to as a tablet terminal 13). The tablet terminal 13 has at least a display mechanism, preferably further has an operation mechanism, and can function as, for example, the above apparatuses (4) to (7). The tablet terminal 13 may further have an imaging mechanism in addition to the above display mechanism and operation mechanism, and may function as at least any of the above apparatuses (1) to (3). That is, the tablet terminal 13 can function as an arbitrary apparatus in the above apparatuses (1) to (7).

The client device 14 is a mobile phone (smartphone) (hereinafter, also simply referred to as a mobile phone 14). Note that, since the function of the mobile phone 14 in the system 10 is similar to that of the tablet terminal 13, detailed description thereof will be omitted. Note that, although not shown, for example, devices such as a portable game machine, a portable music player, or a digital camera can function as similar to the tablet terminal 13 or the mobile phone 14 in the system 10, as long as they have a communication mechanism, a display mechanism, an operation mechanism, or an imaging mechanism.

The client device 15 is a laptop personal computer (PC) (hereinafter, also simply referred to as a laptop PC 15). The laptop PC 15 has a display mechanism and an operation mechanism, and functions as the above apparatuses (4) to (7). In the illustrated example, the laptop PC 15 is handled as an example of a device that does not function as the above apparatuses (1) to (3) because it is basically fixed and used. Although not illustrated, a desktop PC, a television, and the like, for example, can function similarly to the laptop PC 15. The laptop PC 15 has a display as a display mechanism, and a mouse and a keyboard as an operation mechanism, displays images provided from the above apparatuses (1) to (3) directly or via various devices, and accepts various operations by a user on the image. Furthermore, in a case where the laptop PC 15 further has an imaging mechanism such as a camera, the laptop PC 15 can also function as the above apparatuses (1) to (3).

The client device 16 is a fixed camera (hereinafter, also simply referred to as a fixed camera 16). The fixed camera 16 has an imaging mechanism, and functions as the above apparatuses (1) to (3). In the illustrated example, the fixed camera 16 is handled as an example of a device that does not function as the above apparatuses (4) to (7) because it is fixed and used and does not have a display mechanism. Although not illustrated, for example, also in a case where a desktop PC or a television has a camera for displaying a front of a screen, or a case where a movable device such as a digital camera is temporarily fixed to a tripod or the like, these devices can function similarly to the fixed camera 16. The fixed camera 16 has a camera as an imaging mechanism, and can acquire an image of the real space from a fixed viewpoint (including a case where the camera swings automatically or according to an operation by a user viewing a captured image).

The client device 17 is a projector (hereinafter, also simply referred to as a projector 17). The projector 17 has a projection device as a display mechanism, and functions as the above apparatus (7). In the illustrated example, the projector 17 is handled as an example of a device that does not function as the above apparatuses (1) to (6) because it does not have an imaging mechanism and also does not have an operation mechanism for accepting an input to a displayed (projected) image. The projector 17 projects an image on a surface of a screen or an object using the projection device to cause various images to be displayed in the real space. Note that, although the projector 17 of a fixed type is illustrated, it may be of a hand-held type.

The server 11 functions as at least any of the above apparatuses (1) to (7) independently or in cooperation with the client devices 12 to 17. In other words, the server 11 has a function of acquiring an image of the real space, performing various types of image processing on the acquired image, and causing at least any of the acquired image of the real space or the image acquired by the image processing to be displayed.

By the above-described functions realized by the server 11 and the client devices 12 to 17, a user can view an image of the real space in which, there are, for example, various organisms such as humans, self-propelled objects that autonomously travel in the surface of the earth, the ground, underwater, or the like, or a moving objects such as flying objects that fly in the air, and the space can be shared between various moving objects and the user. Moreover, in a system according to the present embodiment, processing as described in detail below is performed, so that the user can freely view the image of the real space in which the moving object exists, independently of the moving object.

The system according to the present embodiment has been described above. As shown in FIG. 1, the system 10 according to the present embodiment may include a device capable of acquiring an image of the real space, a device capable of providing an image of the real space for viewing by a user and accepting various operations by a user, and a device capable of displaying an image generated by various operations by the user.

Note that various types of information processing including the image processing performed in the system 10 as described above are performed by the server 11 and the client devices 12 to 17 independently or in cooperation with each other. As a result of the server 11 and the client devices 12 to 17 operating independently or cooperating with each other, the information processing apparatus as described in detail below is realized as the whole system 10.

<Device Configuration>

Figure 2:
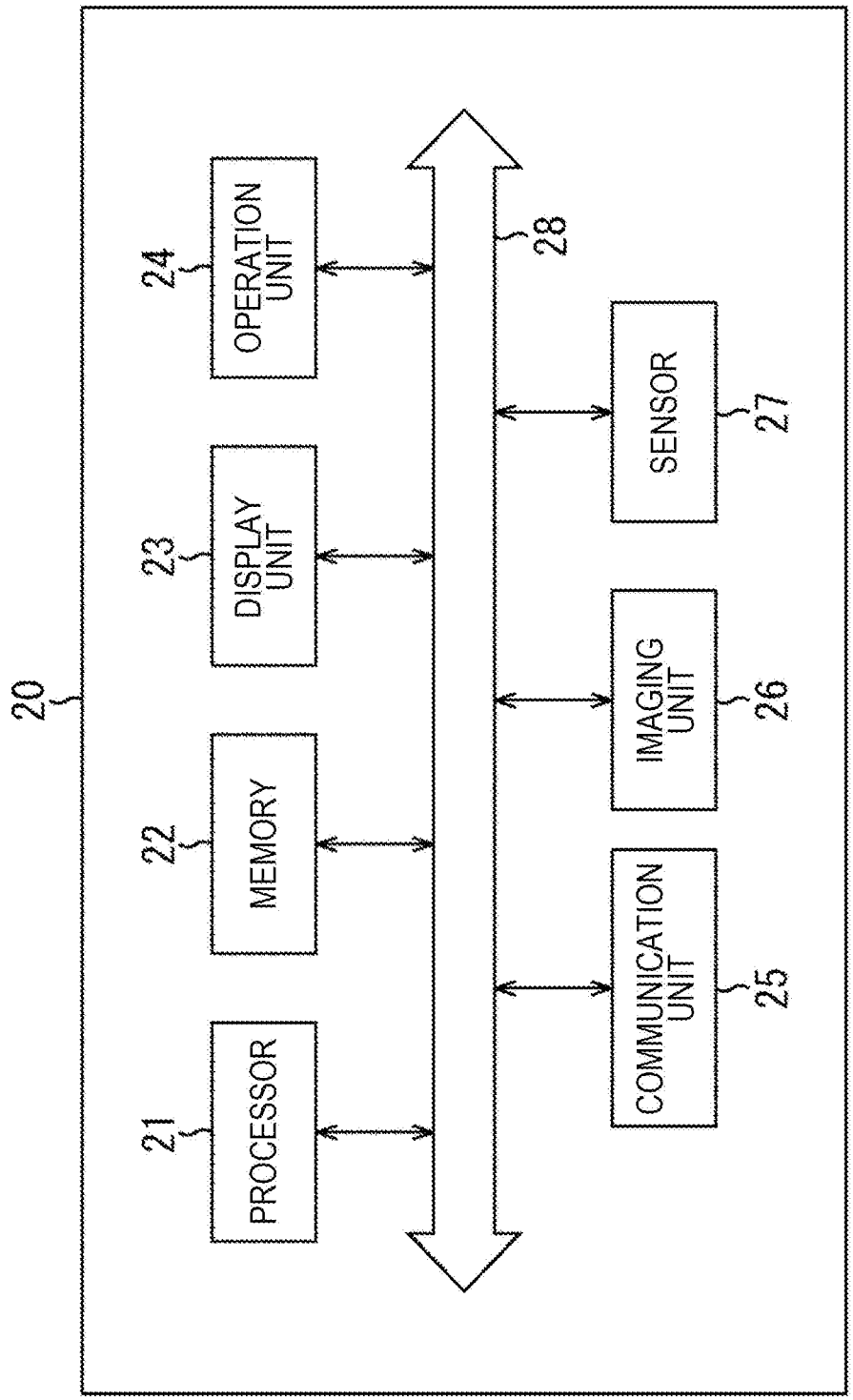
FIG. 2 is a block diagram showing a schematic configuration of an apparatus according to the present embodiment.

FIG. 2 is a diagram showing a schematic configuration of an apparatus according to the present embodiment. As shown in FIG. 2, an apparatus 20 includes a processor 21 and a memory 22. The apparatus 20 may further include at least any of a display unit 23, an operation unit 24, a communication unit 25, an imaging unit 26, or a sensor 27. These components are connected with each other by a bus 28. The apparatus 20 can realize, for example, a server device included in the server 11, and the client devices 12 to 17.

The processor 21 is, for example, various processors such as a central processing unit (CPU) or a digital signal processor (DSP). For example, operations such as calculation and control according to a program stored in the memory 22 are performed to realize various functions. The processor 21 realizes, for example, control functions of the entire apparatus of the server 11 and the client devices 12 to 17. The processor 21 performs various types of image processing as described later and display control for causing an image to be displayed on a display screen, for example, in the server 11 and the client devices 12 to 17.

The memory 22 includes a storage medium such as a semiconductor memory or a hard disk, and stores programs and data for processing by the apparatus 20. For example, the memory 22 may store captured image data acquired by the imaging unit 26 and sensor data acquired by the sensor 27. Note that a part of the programs and data described in this specification may be acquired from an external data source (for example, a data server, a network storage, an external memory, or the like) without being stored in the memory 22.

The display unit 23 is provided, for example, in a client having the above-described display mechanism. The display unit 23 may be a display corresponding to the shape of the apparatus 20, for example. For example, in the above example, the wearable terminal 12 may have a display having, for example, a shape corresponding to a lens portion of eyeglasses or a shape corresponding to a display region of a head mounted display, as the display unit 23. Furthermore, the tablet terminal 13, the mobile phone 14, and the laptop PC 15 may have a flat panel display provided in each casing as the display unit 23. Alternatively, the display unit 23 may be a projection device that projects an image on an object. In the above example, the projector 17 can have a projection device as a display unit.

The operation unit 24 is provided, for example, in a client having the above-described operation mechanism. The operation unit 24 is configured by combining a keyboard, a button, a switch, and the like as necessary with a pointing device such as a touch sensor (included in a touch panel together with a display), a touch pad, or a mouse, provided on a display, for example. The operation unit 24 specifies a position in the image displayed on the display unit 23 with a pointing device, for example, and accepts an operation by a user inputting some information with a keyboard, a button, a switch, or the like with respect to that position. Alternatively, the operation unit 24 may specify a position in the image displayed on the display unit 23 with a pointing device, and further accept an operation by a user inputting some information with a pointing device with respect to that position.

The communication unit 25 is a communication interface that mediates communication with other devices by the apparatus 20. The communication unit 25 supports an arbitrary wireless communication protocol or a wired communication protocol and establishes a communication connection with other devices.

The imaging unit 26 is a camera module for capturing an image. The imaging unit 26 images the real space using an imaging element such as a charge coupled device (CCD) or a complementary metal oxide semiconductor (CMOS), and generates a captured image. A series of captured images generated by the imaging unit 26 forms a video. Note that the imaging unit 26 is not necessarily a part of the apparatus 20. For example, an imaging device that is connected to the apparatus 20 by wired or wireless connection may be handled as the imaging unit 26. Furthermore, the imaging unit 26 may include a depth sensor that measures the distance between the imaging unit 26 and the subject for each pixel. The depth data outputted from the depth sensor can be used to recognize an environment in the image of the real space captured as described later.

The sensor 27 may include various sensors such as a positioning sensor, an acceleration sensor, or a gyro sensor. The measurement result acquired in the sensor 27 may be used for various purposes such as aiding recognition of an environment in a captured image of the real space, acquisition of data specialized in a geographical position, or detection of a user input. Note that the sensor 27 can be provided in a device having the imaging unit 26 (in the above example, the wearable terminal 12, the tablet terminal 13, the mobile phone 14, the fixed camera 16, or the like).

<Regarding Configuration of Information Processing Apparatus>

Next, the configuration of the information processing apparatus according to the present embodiment, which is realized as the whole of the system 10 by the server 11 and the client devices 12 to 17 operating independently or cooperating with each other as described above, will be mainly described in detail for its function.

Here, the type of the captured image handled by the information processing apparatus 50 according to the present embodiment is not particularly limited, and it may be a still image or a moving image.

Furthermore, it is preferable that the captured image handled by the information processing apparatus 50 according to the present embodiment is a captured image of a range in the real space as large as possible. Accordingly, it is preferable that the imaging device used for imaging the real space is a camera to which a lens having an angle as large as possible is mounted, for example, an entire circumference camera schematically shown in FIG. 3.

Figure 3:
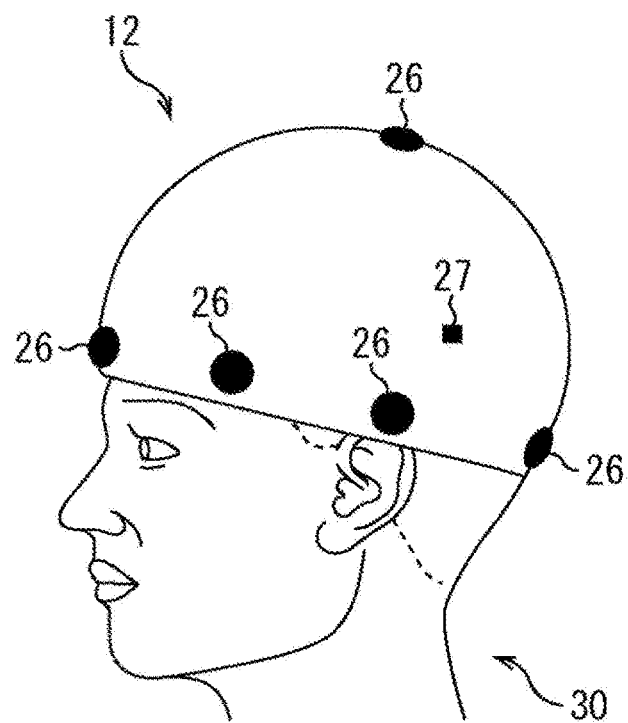
FIG. 3 is a diagram schematically showing an example of a wearable terminal according to the present embodiment.

FIG. 3 schematically illustrates a configuration in a case where an entire circumference camera for imaging the real space is realized as the wearable terminal 12. In the wearable terminal 12 shown in FIG. 3, the imaging unit 26, which is a camera to which the lens having an angle as large as possible is mounted, is annularly provided so as to cover the circumference of the human head that is an example of the moving object 30. Furthermore, since it is difficult to acquire an image in the zenithal direction only by installing the imaging unit 26 in the circumference of the human head, in FIG. 3, the imaging unit 26 is also provided at the top of the head. Furthermore, in the wearable terminal 12, various sensors 27 such as a positioning sensor, an acceleration sensor, and a gyro sensor are provided. Information associated with the line of sight (in other words, the posture of the imaging device) of the imaging device, which is outputted from the sensor 27, is outputted to an information processing apparatus as described later, and used in such an information processing apparatus, as imaging device posture information that is information associated with the posture of the imaging device.

Note that, in the example shown in FIG. 3, a case where the imaging unit 26 is annularly arranged to acquire an entire circumference captured image is shown. On the other hand, in a case where the image handled by the information processing apparatus 50 is not necessarily the entire circumference captured image, it is unnecessary to arrange the imaging unit 26 in an annular shape, and an imaging unit 26 may be provided in at least a part of the human head. The number of the imaging units 26 used for realizing the wearable terminal 12 as shown in FIG. 3 is not limited, and the number of units may be appropriately set according to the extent of a range for which the image is acquired.

Furthermore, although FIG. 3 illustrates a case where the moving object 30 is a human, the moving object 30 is not limited to a human, and may be an animal other than a human wearing the wearable terminal 12, or may be a self-propelled body such as a robot with a camera mounted thereto or a flying object.

An information processing apparatus 50 that performs various types of information processing on a captured image captured by the imaging device as illustrated in FIG. 3 is an apparatus that performs control of causing a display image to be displayed in a display region viewed by a user, the display image generated on the basis of image information generated by imaging by an imaging device mounted to a moving object moving in the space, imaging device posture information that is information associated with the posture of the imaging device, and user viewing information for identifying a region that the user desires to view, acquired from a user operated device operated by the user. Note that the imaging device posture information is, for example, information associated with the rotation of the imaging device, and the user viewing information may be, for example, information for specifying a display angle of view desired to be viewed by the user in the entire circumference captured image captured by the imaging device.

Figure 4:
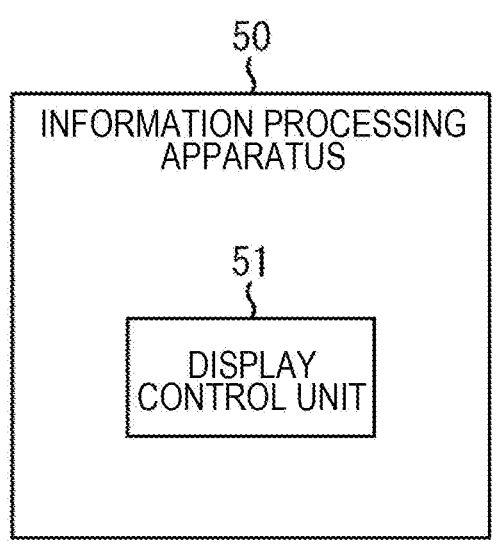
FIG. 4 is a block diagram showing a configuration example of an information processing apparatus according to the present embodiment.
Figure 5:
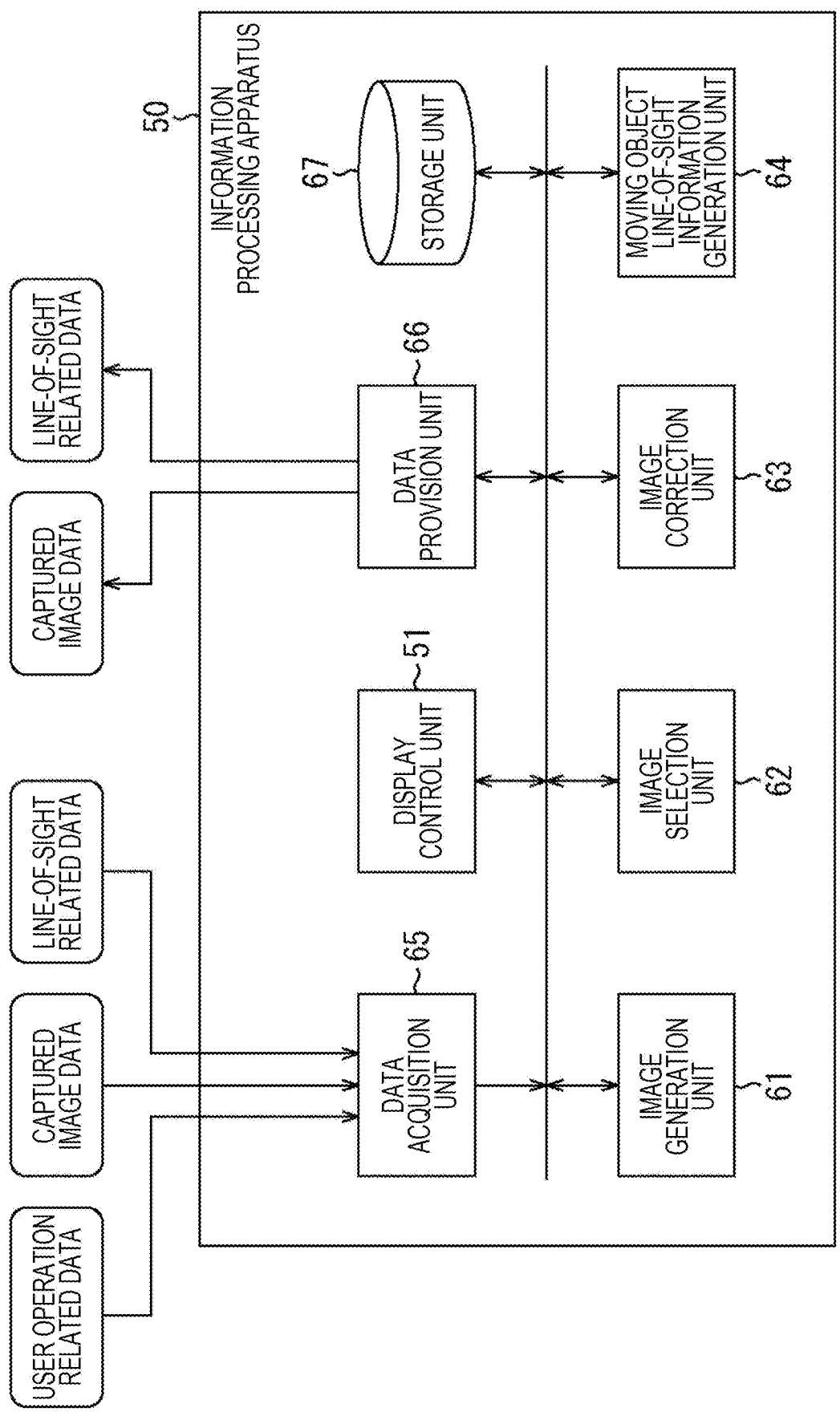
FIG. 5 is a block diagram showing another configuration example of the information processing apparatus according to the present embodiment.

As shown in FIG. 4, for example, the information processing apparatus 50 includes at least a display control unit 51 that is an example of a control unit. Furthermore, in addition to the display control unit 51, the information processing apparatus 50 may further include at least any of an image generation unit 61, an image selection unit 62, an image correction unit 63, a moving object line-of-sight information generation unit 64, a data acquisition unit 65, a data provision unit 66, and a storage unit 67, as shown in FIG. 5. Here, each of the processing units shown in FIGS. 4 and 5 may be realized in any one device of the server 11 or the client devices 12 to 17, or may be realized by being distributed among a plurality of the devices.

Note that, in the following description, described is a case where the information processing apparatus 50 performs display control of a display image generated on the basis of the captured image captured by the imaging device, the imaging device posture information, and the user viewing information. However, it is needless to say that the information processing apparatus 50 may perform display control as similar to below on the basis of the user viewing information and the generated image (for example, a corrected image acquired by performing correction on the posture of the imaging device in advance with respect to the captured image) generated on the basis of the captured image and the imaging device posture information, for example, by the imaging device, or another device that is different from the imaging device and the information processing apparatus.

The image generation unit 61 uses the captured image captured by the imaging device mounted to the moving object moving in the space to generate a circumference captured image acquired by imaging the circumference of the position where the moving object 30 exists. The generation processing of the circumference captured image by the image generation unit 61 is performed at any time in real time when the captured image is outputted from the imaging device as shown in FIG. 3, for example.

Figure 6:
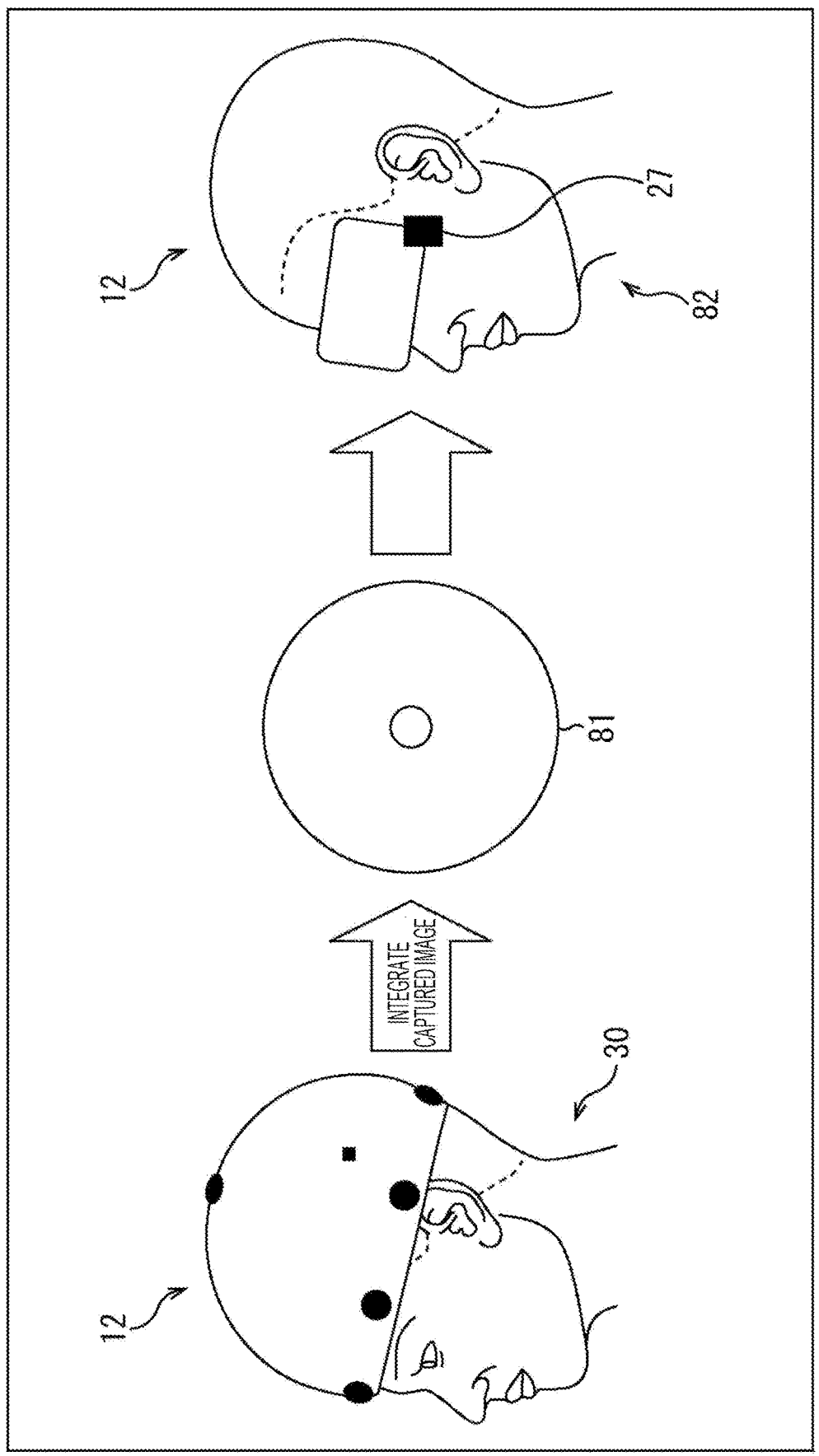
FIG. 6 is a diagram for explaining an example of a circumference captured image according to the present embodiment.

Here, in a case where the captured image used for generating the circumference captured image is captured by the entire circumference camera as illustrated in FIG. 3, the circumference captured image generated by the image generation unit 61 integrating the captured images is an entire circumference captured image (omnidirectional image) 81 as shown in FIG. 6. Note that there is no particular limitation on a method for generating a circumference captured image from a plurality of captured images captured by a plurality of cameras, and a known method may be applied. Furthermore, the entire circumference captured image may include an omnidirectional circumference image that is a columnar image being a 360-degree circumference captured image without the vertical (up and down) of the image.

Figure 7:
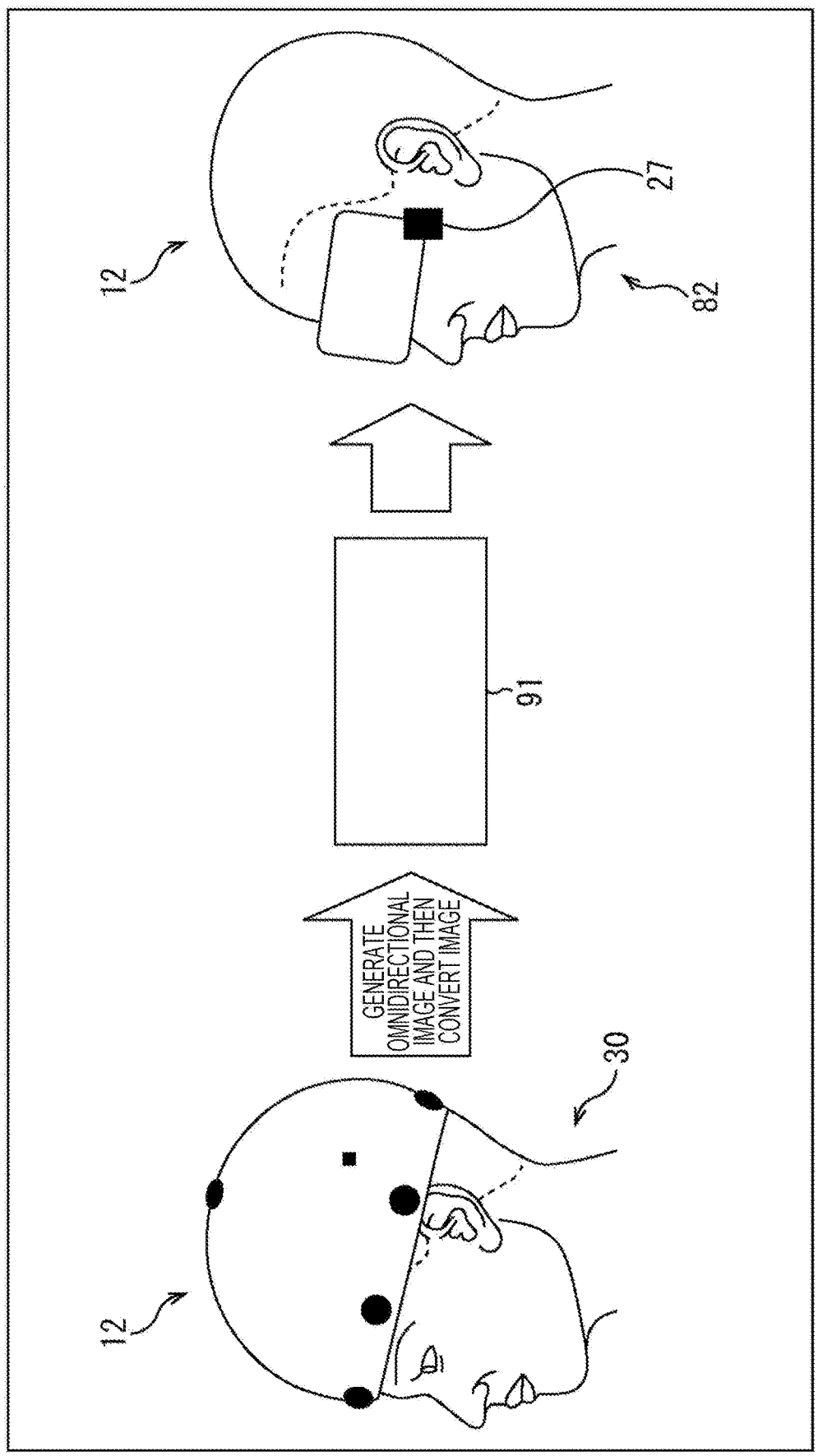
FIG. 7 is a diagram for explaining another example of the circumference captured image according to the present embodiment.

The image generation unit 61 may generate, as the circumference captured image, not the entire circumference captured image (omnidirectional image) 81 as shown in FIG. 6, but a rectangular image 91 equivalent to the omnidirectional image as shown in FIG. 7. The rectangular image 91 equivalent to the omnidirectional image 81 can be generated by converting the omnidirectional image 81, for example, by a known method such as equirectangular projection. By using the rectangular image 91 as shown in FIG. 7 instead of the omnidirectional image 81 as shown in FIG. 6 as the circumference captured image, it is possible to perform various types of image processing more easily.

The image selection unit 62 selects, from among the circumference captured images, the captured image corresponding to the user viewing information as the user viewing image on the basis of the circumference captured image generated by the image generation unit 61 and the user viewing information acquired from a user operated device operated by the user, the user viewing information indicating the space desired to be viewed by the user. The user viewing image selected by the image selection unit 62 is provided to the user operated device operated by the user and is provided for viewing by the user. In the example shown in FIGS. 6 and 7, for example, the user operated device is a wearable terminal 12 such as a head mounted display that is worn by a user 82 different from the moving object 30. As a result, the user operating the user operated device can share the space with the moving object 30 moving in a certain space, and the position that the user desires to view in the space can be selected independently of the moving object 30. As a result, in the space in which the moving object 30 exists, the user can freely select an image at a position different from the position viewed by the moving object 30.

As compared to a spatial re-synthesis technique in which processing with high calculation cost such as verification of feature points between images is used frequently, such generation processing of the circumference captured image and image selection processing from the circumference captured image require less calculation cost to perform the processing. Accordingly, the information processing apparatus 50 capable of performing such processing can realize reduction in size and weight of the apparatus.

Here, the user viewing information set by the user operated device is generated by operating a various input mechanisms such as a touch pad, a keyboard, or a mouse provided on the user operated device by the user, and transmitted to the image selection unit 62. In a case where the user operated device is the wearable terminal 12 as shown in FIGS. 6 and 7, the user viewing information may be generated by automatic detection of a user behavior (for example, a line-of-sight direction of the user) with various sensors such as a positioning sensor, an acceleration sensor, or a gyro sensor provided in the wearable terminal 12. Furthermore, such user viewing information may be generated by a user's voice input to the user operated device, a gesture input, or the like.

As described above, the information processing apparatus 50 according to the present embodiment is provided with the image generation unit 61 and the image selection unit 62 so that the image of the space viewed with the moving object 30 (more specifically, the imaging device) (so-called first person viewpoint image) is provided to the user (for example, the user 82 in FIG. 6 and FIG. 7) in real time. Here, in the first person viewpoint image, severe shaking of the screen may occur, which is caused by looking around the position where the moving object 30 itself exists. If the user views such severe shaking of the screen, the user sometimes feels "sick" (motion sickness) due to viewing of the image with severe shaking. Accordingly, the information processing apparatus 50 according to the present embodiment further has a correction function for correcting the rotational motion as described above in the imaging device.

The image correction unit 63 is a processing unit that corrects the image change accompanying the rotational motion of the imaging device as described above on the basis of the imaging device posture information. In a case where the line-of-sight direction of the imaging device has changed (in other words, the rotational motion occurs in the imaging device) without changing the position of the imaging device, the image correction unit 63 performs correction for suppressing a change in the circumference captured image accompanying a change in the line-of-sight direction of the imaging device with respect to the circumference captured image.

Furthermore, the image correction unit 63 determines presence or absence of a missing in the stabilized image (circumference captured image) after the above correction. The image correction unit 63 supplies missing information such as the presence or absence of a missing, and the position, the range, the shape, or the number of pieces of a missing, that are determination results, as it is or as metadata to the display control unit 51 and the data provision unit 66. Then, the image correction unit 63 causes the missing information to be displayed in order to suggest the missing information to the user of the moving object, or causes the missing information to be displayed in order to provide the missing information to the server 11 or another wearable device 12 via a network to suggest the missing information to the user. Furthermore, in response to a request from any of the users, the image correction unit 63 performs missing supplement processing and corrects the circumference captured image. Note that the missing supplement processing may be performed by the server 11 or another wearable terminal 12.

The moving object line-of-sight information generation unit 64 generates line-of-sight information indicating the direction (position) of the line of sight or the visual field of the imaging device on the basis of the imaging device posture information. The line-of-sight information can be generated by a known direction using output information (in other words, the imaging device posture information) from various sensors mounted to the moving object, for example. By providing such line-of-sight information to the user together with the circumference captured image generated by the image generation unit 61, an object indicating a direction (position) of the line of sight or a visual field of the imaging device can be displayed in the user viewing image provided to the user operated device. As a result, the user can grasp the line-of-sight direction of the imaging device at any time while viewing the circumference captured image in any direction different from the direction (position) of the line of sight or the visual field of the imaging device.

The display control unit 51 controls display contents of a display device such as a display provided in the information processing apparatus 50 or outside the information processing apparatus 50. Specifically, the display control unit 51 performs control of causing a display image to be displayed in a display region viewed by a user, the display image generated on the basis of image information generated by imaging by an imaging device mounted to a moving object moving in the space, imaging device posture information that is information associated with the posture of the imaging device, and user viewing information for identifying a region that the user desires to view, acquired from a user operated device operated by the user. Furthermore, the display control unit 51 can perform display control of a display screen of the user operated device to cause an object representing the line-of-sight direction and the field of view of the imaging device to be displayed in the user viewing image, for example. As a result, the user can grasp the line-of-sight direction of the moving object 30 at any time while selecting the line-of-sight direction independently of the moving object 30.

Furthermore, the display control unit 51 controls, for example, screen display for selecting whether or not display of missing information or missing supplement is performed in accordance with the determination result by the image correction unit 63. In that case, with metadata, in a case where each region is larger than a predetermined region, the color may be changed and displayed, or in a case where the ratio of all the missing regions is larger than a predetermined ratio, the colors may be changed and displayed.

The data acquisition unit 65 acquires captured image data outputted from an imaging device mounted to the moving object 30 and line-of-sight related data including a sensor output (in other words, imaging device posture information) and the like regarding the line-of-sight direction of the imaging device. Furthermore, the data acquisition unit 65 acquires data related to the user operation outputted from the user operated device. Various types of data acquired from the various devices by the data acquisition unit 65 can be appropriately used by each processing unit of the information processing apparatus 50.

The data provision unit 66 provides various types of data (for example, captured image data such as the circumference captured image and the user viewing image, and line-of-sight related data such as the line-of-sight direction of the imaging device) generated by the information processing apparatus 50 to a device provided outside the information processing apparatus 50. As a result, it possible to use various types of information generated by the information processing apparatus 50 even in a device provided outside the information processing apparatus 50.

Various databases used for processing in the image generation unit 61, the image selection unit 62, the image correction unit 63, the moving object line-of-sight information generation unit 64, the display control unit 51, the data acquisition unit 65, and the data provision unit 66 are recorded in the storage unit 67 as appropriate. Furthermore, various programs including applications to be used for various types of calculation processing performed by these processing units, various parameters or progress of processing caused to be needed to be saved at the time of some processing, and the like may be appropriately recorded in the storage unit 67.

Each processing unit such as the image generation unit 61, the image selection unit 62, the image correction unit 63, the moving object line-of-sight information generation unit 64, the display control unit 51, the data acquisition unit 65, the data provision unit 66 can freely access to the storage unit 67 and write and read data.

An example of the functions of the information processing apparatus 50 according to the present embodiment has been described above. Each component described above may be configured using general-purpose members and circuits, or may be configured with hardware specialized for the function of each component. Furthermore, the functions of the components may be all performed by the CPU or the like. Accordingly, it is possible to appropriately change the configuration to be used, according to the technical level at the time of implementing this embodiment.

Note that a computer program for realizing each function of the information processing apparatus according to the present embodiment as described above can be manufactured and mounted on a personal computer or the like. Furthermore, it is possible to provide a computer readable recording medium in which such a computer program is stored. The recording medium is, for example, a magnetic disk, an optical disk, a magneto-optical disk, a flash memory, or the like. Furthermore, the computer program described above may be delivered via, for example, a network without using a recording medium.

Furthermore, the image generation unit 61, the image selection unit 62, the image correction unit 63, the moving object line-of-sight information generation unit 64, the data acquisition unit 65, the data provision unit 66, and the storage unit 67 shown in FIG. 5 are mounted in another device such as a computer capable of communicating with each other with the information processing apparatus 50, and the above-described functions may be realized by the information processing apparatus 50 and another device cooperating with each other.

Next, the present technology will be described in detail.

In a case where a plurality of cameras are used to photograph an omnidirectional image, a photographing cover range of each camera image changes due to a change in a relative positional relationship between the cameras or the like, and there is a possibility that a place where photographing cannot be performed occurs. In particular, this can happen in a case of omnidirectional photographing with a camera (wearable camera) that can be mounted on the body such as the headgear with camera 101 as described later or with the small number of cameras. With this image missing state, since an incomplete image as a photographed omnidirectional movie is acquired, it is necessary to avoid this state.

Therefore, in the present technology,

1. Before photographing and distributing, it is notified that there is a missing.

Note that the notification is made to a user who is photographing, (a manager of) the server 11, the user who is browsing, or the like.

2. In a case where the notification of 1 cannot be performed for some reason, and the positional relationship changes during photographing and a missing occurs, or in response to a request from any of the above users, supplement of image missing is performed from image stabilization or synthesis of past video frames.

Specific Configuration Example

Figure 8:
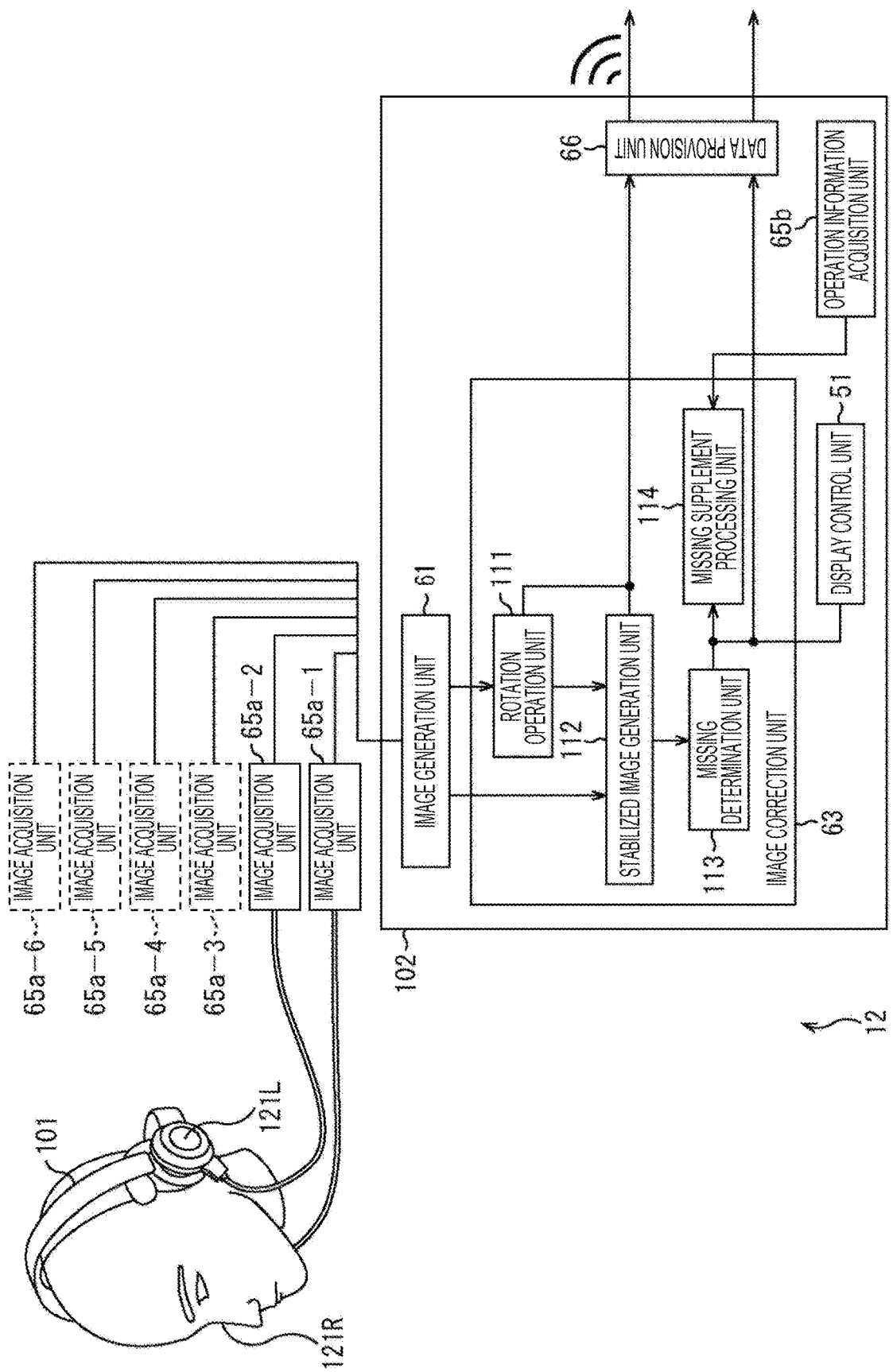
FIG. 8 is a block diagram showing a configuration example of a wearable terminal according to the present embodiment.

FIG. 8 is a block diagram showing a specific configuration example in a case where the entire circumference image camera for imaging the real space is realized by the wearable terminal 12 including two fisheye lenses.

In the example of FIG. 8, the wearable terminal 12 includes a headgear with camera 101 and an information processing apparatus 102.

The headgear with camera 101 is mounted to a human head as an example of the moving object 30, and has cameras 121L and 121R as the imaging unit 26 on the outside of positions corresponding to the left and right ears. Each of the cameras 121L and 121R is provided with a fisheye lens with a large angle (for example, 250 degrees). The cameras 121L and 121R are connected to the corresponding image acquisition units 65a-1 to 65a-5 of the information processing apparatus 102 via an HDMI cable, and supply the captured images to the image acquisition units 65a-1 to 65a-5, respectively.

The information processing apparatus 102 is configured basically similarly to the information processing apparatus 50 in FIG. 5. However, in the example of FIG. 8, illustration of those which are not directly related is omitted. In other words, the information processing apparatus 102 includes the image generation unit 61, the image acquisition units 65a-1 to 65a-6 and the operation information acquisition unit 65b that are part of the data acquisition unit 65, the image correction unit 63, the data provision unit 66, and the display control unit 51. Note that, in the example of FIG. 8, as indicated by the dotted line, the image acquisition units 65a-1 and 65a-2 corresponding to the cameras 121L and 121R provided in the headgear with camera 101 are used, and the remained units are not used. In other words, the image acquisition units 65a-1 to 65a-6 are used according to the number of cameras. Note that the number of cameras is not limited to two or six, and may be plural as long as the entire circumference can be imaged.

Figure 9:
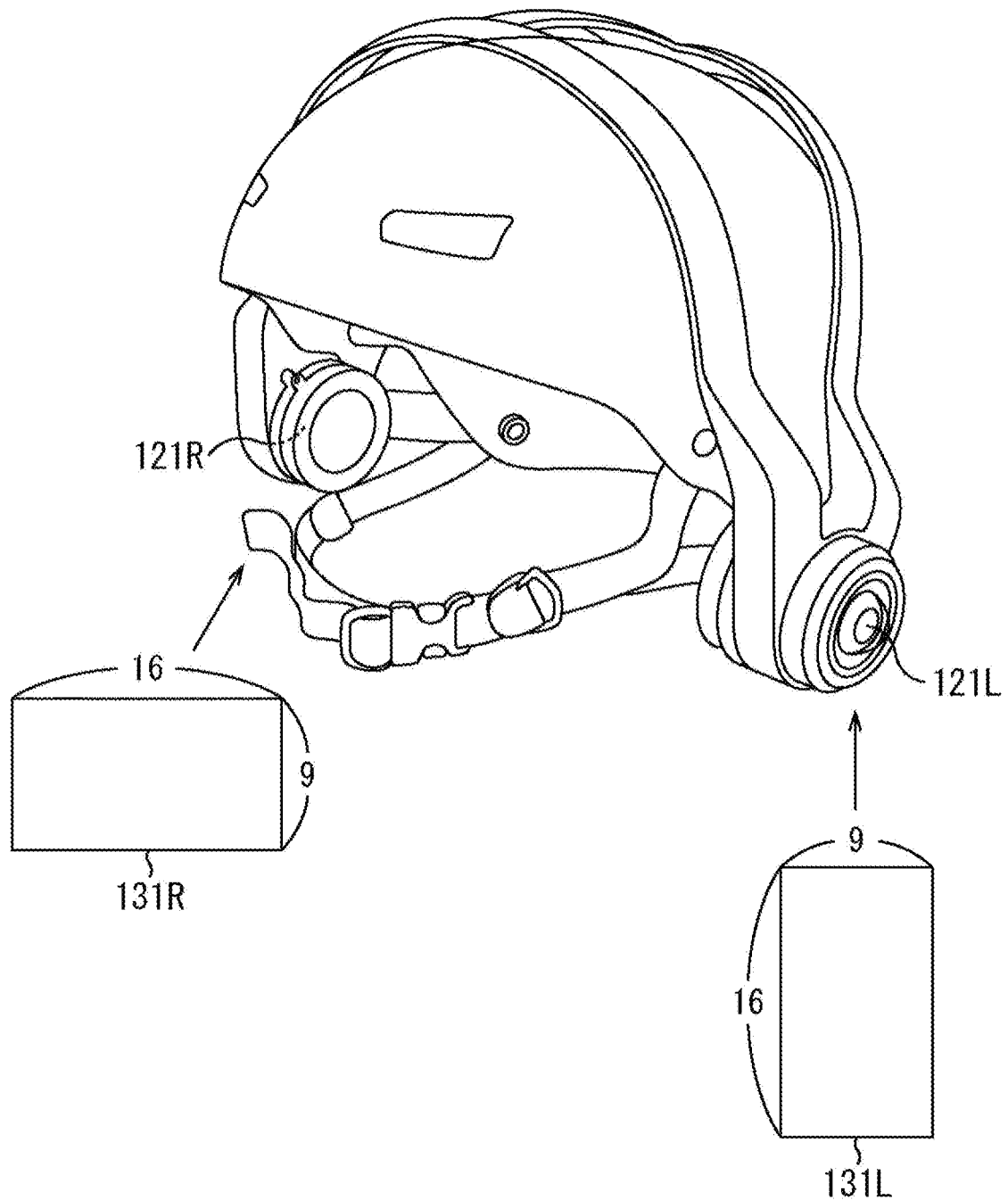
FIG. 9 is a diagram for explaining a headgear with camera of the wearable terminal of FIG. 8.

Then, for example, as shown in FIG. 9, in the camera 121R, the fisheye lens is arranged so as to be horizontally long with the aspect ratio of 9 to 16. From the camera 121R, a horizontally long image 131R with the aspect ratio of 9 to 16 is inputted by imaging. On the other hand, in the camera 121L, the fisheye lens is arranged so as to be vertically long with the aspect ratio of 16 to 9. From the camera 121L, a vertically long image 131L with the aspect ratio of 16 to 9 is inputted by imaging. In other words, the longitudinal direction of the image 131R and the longitudinal direction of the image 131L intersect with each other. Note that the aspect ratio of the installation of the fisheye lens may be reversed to the left and right of the example of FIG. 9, for example, a vertically long image 131L may be inputted from the camera 121R and a horizontally long image 131R may be inputted from the camera 121L.

The image acquisition unit 65a-1 acquires the horizontally long image 131R from the camera 121R, and supplies data of the acquired image 131R to the image generation unit 61. The image acquisition unit 65a-2 acquires the vertically long image 131L from the camera 121L, and supplies data of the acquired image 131L to the image generation unit 61. In accordance with the display controlled by the display control unit 51 or the like, the operation information acquisition unit 65b acquires operation information inputted according to operation or the like by a user of the touch panel, the operation unit 24, or the like, a manager (user) of the server 11, or a user 82 of the wearable terminal 12 different from the moving object 30. The operation information acquisition unit 65b supplies the acquired operation information to a missing supplement processing unit 114 of the image correction unit 63 as described later.

Figure 10:
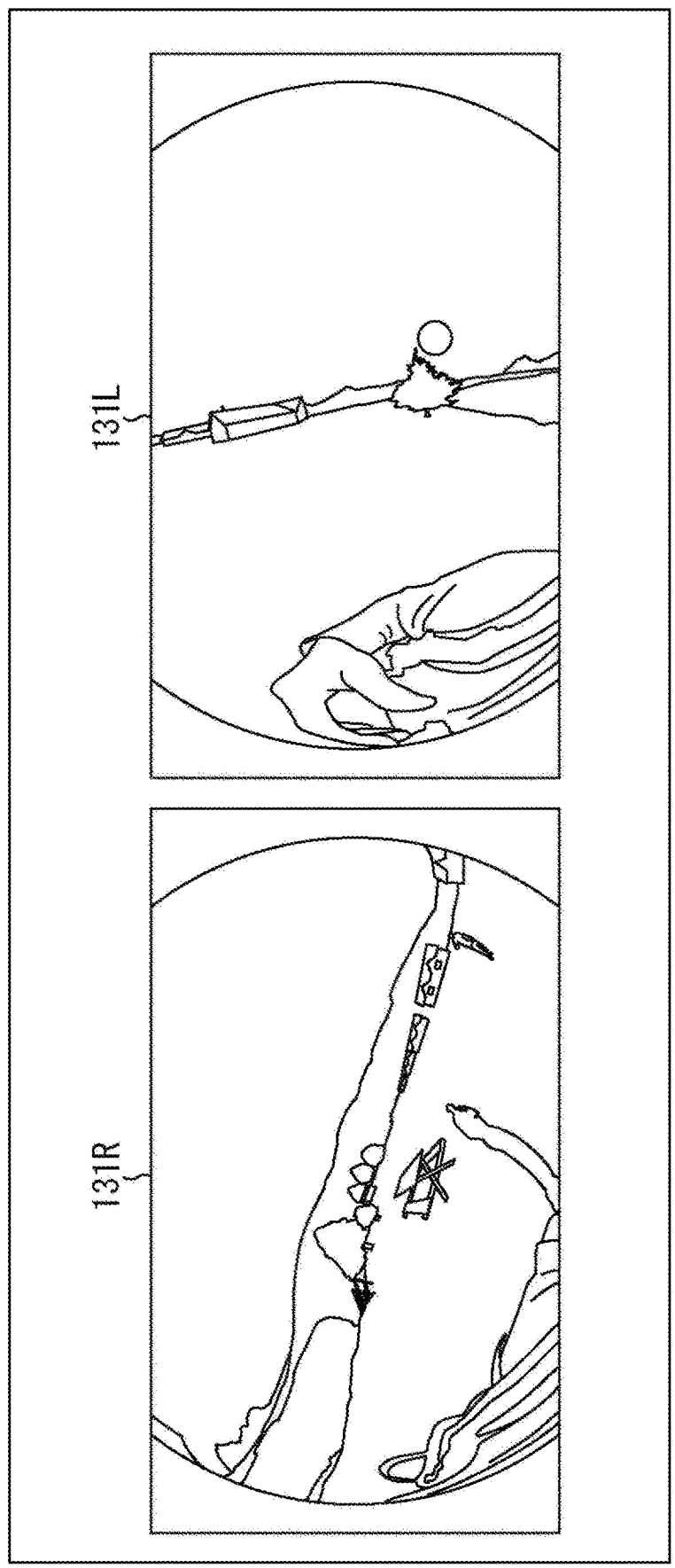
FIG. 10 is a diagram showing an example of an image captured by the camera of FIG. 9.
Figure 11:
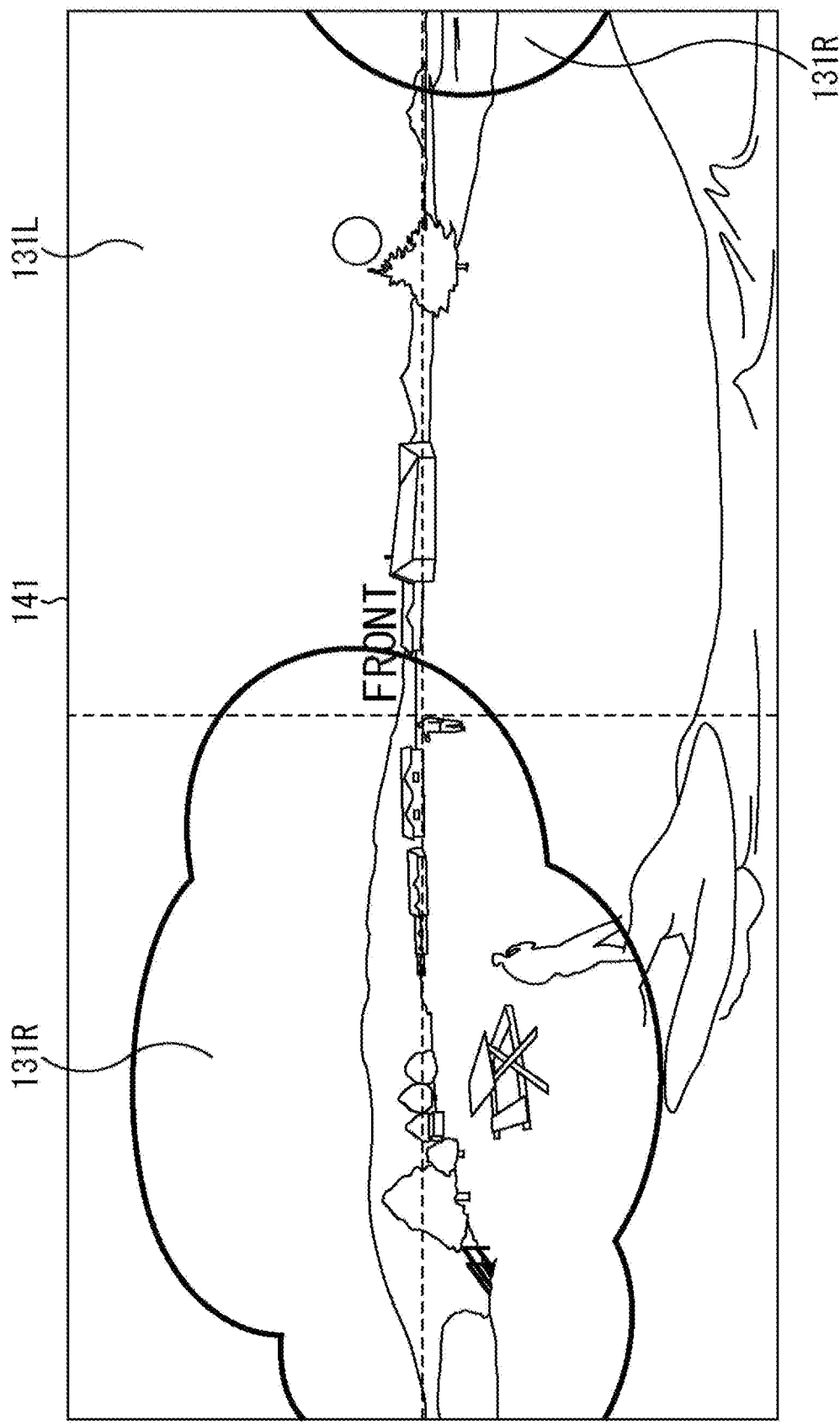
FIG. 11 is a diagram for explaining a method of generating an image using the image of FIG. 10.
Figure 12:
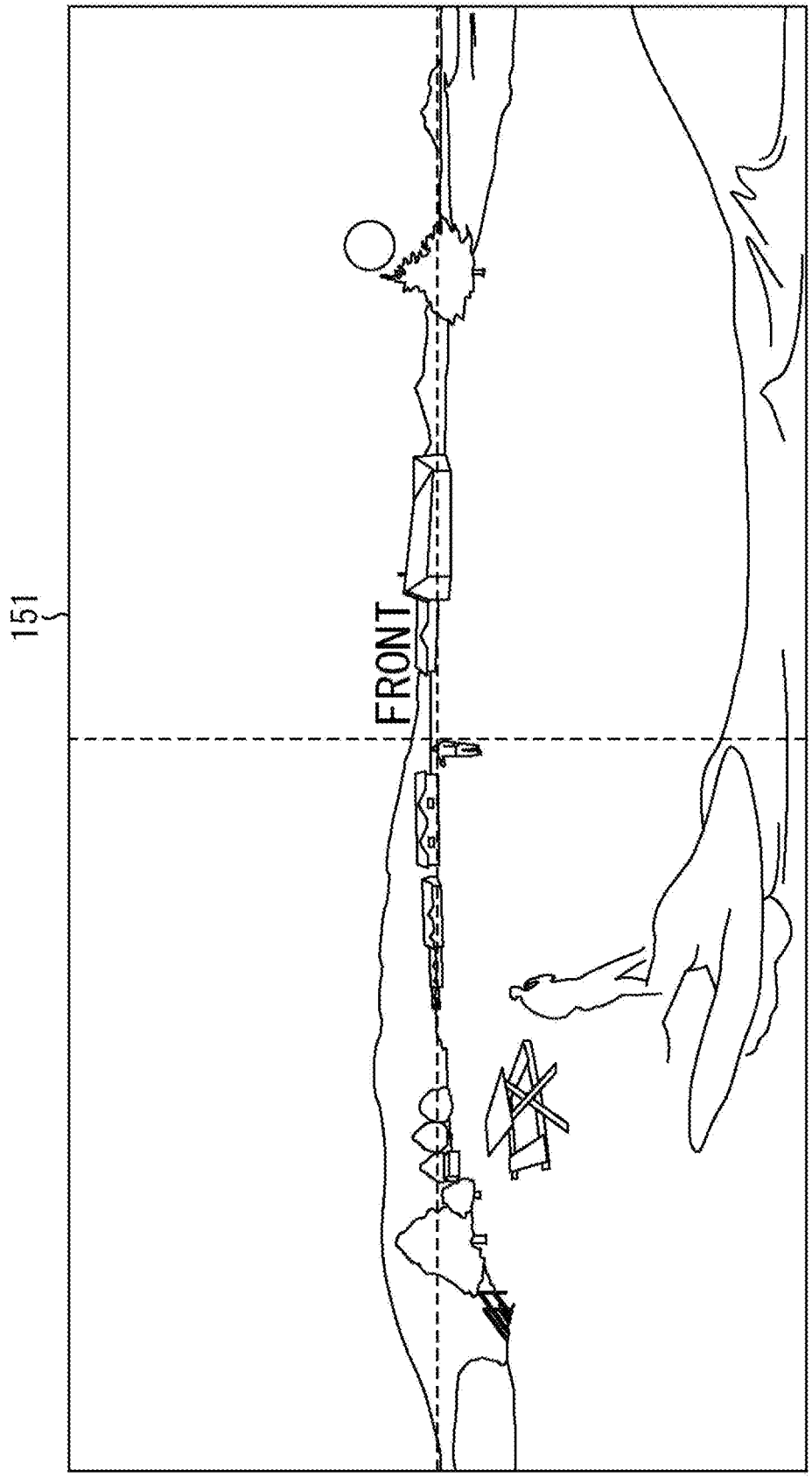
FIG. 12 is a diagram showing an example of an image generated from the image of FIG. 10.

The image generation unit 61 uses the horizontally long image 131R (FIG. 10) and the vertically long image 131L (FIG. 10) to synthesize the images as a stitching method of a ball for baseball or a tennis ball (a rectangular image 141 in FIG. 11) as shown in FIG. 11, for example, to generate a rectangular image (circumference captured image) 151 equivalent to an omnidirectional image as shown in FIG. 12. In other words, the horizontally long image 131R and the vertically long image 131L are connected to both end portions in the longitudinal direction of the image 131R and both end portions of the image 131L extending along the longitudinal direction of the image 131L, respectively. Note that, in the example of FIGS. 11 and 12, the intersection of the dotted lines is the center of the display unit for displaying the rectangular images 141 and 151. Actually, the stitched portion of the rectangular images 141 and 151 is deviated from the center of the display unit. There is often a line of sight at the center of the display unit, and there is a sense of incompatibility when the stitched portion of the images comes to the center of the display unit, and the deviation is for avoiding this. The image generation unit 61 supplies the generated rectangular image to the image correction unit 63 and the data provision unit 66.

The image correction unit 63 includes a rotation operation unit 111, a stabilized image generation unit 112, a missing determination unit 113, and a missing supplement processing unit 114. The rectangular image generated by the image generation unit 61 is supplied to the rotation operation unit 111 and the stabilized image generation unit 112.

The rotation operation unit 111 performs operation for correcting a change in the image accompanying the rotational motion of the headgear with camera 101, and supplies the operation value to the stabilized image generation unit 112. The stabilized image generation unit 112 performs stabilization processing for suppressing rotation by using the operation value from the rotation operation unit 111 to generate a stabilized image. In other words, in a case where a rotational motion occurs in the headgear with camera 101, the rotation operation unit 111 and the stabilized image generation unit 112 perform correction to suppress the change in the circumference captured image in accordance with the change in the line-of-sight direction of the headgear with camera 101 with respect to the circumference captured image. The case where a rotational motion occurs in the headgear with camera 101 is a case where the line-of-sight direction of the headgear with camera 101 has changed without changing the position of the headgear with camera 101, or the like. The stabilized image generation unit 112 supplies the generated stabilized image to the missing determination unit 113 and the data provision unit 66.

Figure 13:
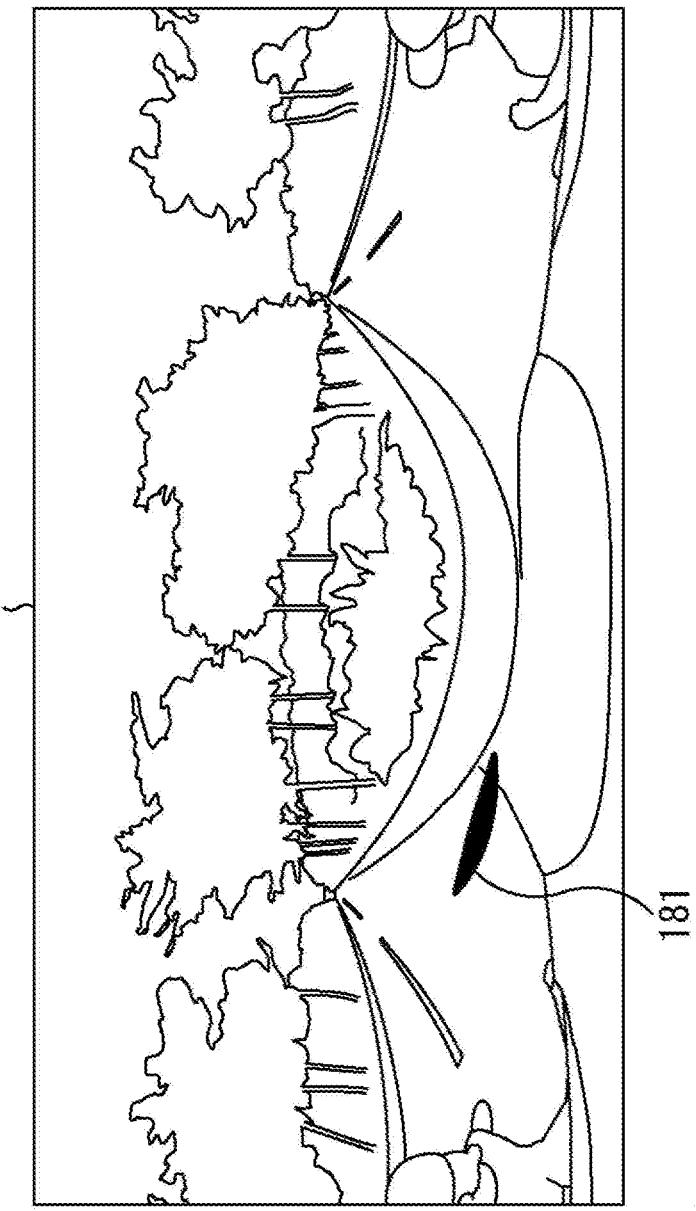
FIG. 13 is a diagram showing an example of a missing in an image.

The missing determination unit 113 determines whether or not there is a missing portion (the missing portion 181 in FIG. 13) that occurs after the stabilization processing is performed on the stabilized image (the image 171 in FIG. 13) from the stabilized image generation unit 112. The missing determination unit 113 supplies the determination result on the presence or absence of a missing of the stabilized image, and, in a case where there is a missing portion, information associated with the missing such as indication of the position of the missing portion, to the missing supplement processing unit 114 and the display control unit 51. Note that, in the image 171 of FIG. 13, unlike the examples of FIGS. 11 and 12, for example, the central region of one image (vertically long image 131R) indicated as a circle region corresponds to the line-of-sight direction of the wearing user. The method of synthesizing images is not limited to the method of FIGS. 11 and 12, and images may be synthesized as FIG. 13.

In accordance with the display controlled by the display control unit 51 or the like from the operation information acquisition unit 65b, the missing supplement processing unit 114 acquires operation information inputted according to operation or the like by a user of the touch panel, the operation unit, or the like, a manager (user) of the server 11, or a user 82 of the wearable terminal 12 different from the moving object 30. In accordance with the acquired operation information, the missing supplement processing unit 114 performs missing supplement processing on the stabilized image determined to have a missing from the stabilized image generation unit 112. The missing supplement processing unit 114 supplies the image that has been missing-supplemented to the data provision unit 66.

The display control unit 51 controls display of the determination result on the presence or absence of a missing of the stabilized image, and, in a case where there is a missing portion, missing information regarding the missing such as indication of the size, shape, number, or position of the missing portion. Furthermore, the display control unit 51 also controls a screen display for selecting whether or not to perform missing supplementation, or the like.

The data provision unit 66 transmits the stabilized image and the operation value from the rotation operation unit 111, as necessary, to the server 11, and provides these to the user of the information processing system 10. Note that, together with the stabilized image, missing information regarding the missing such as indication of the size, shape, number, or position of the missing portion may be transmitted as metadata, or the missing portion may be highlighted, and moreover, the highlighted missing portion may be transmitted as superimposition data.

Operation Example

Figure 16:
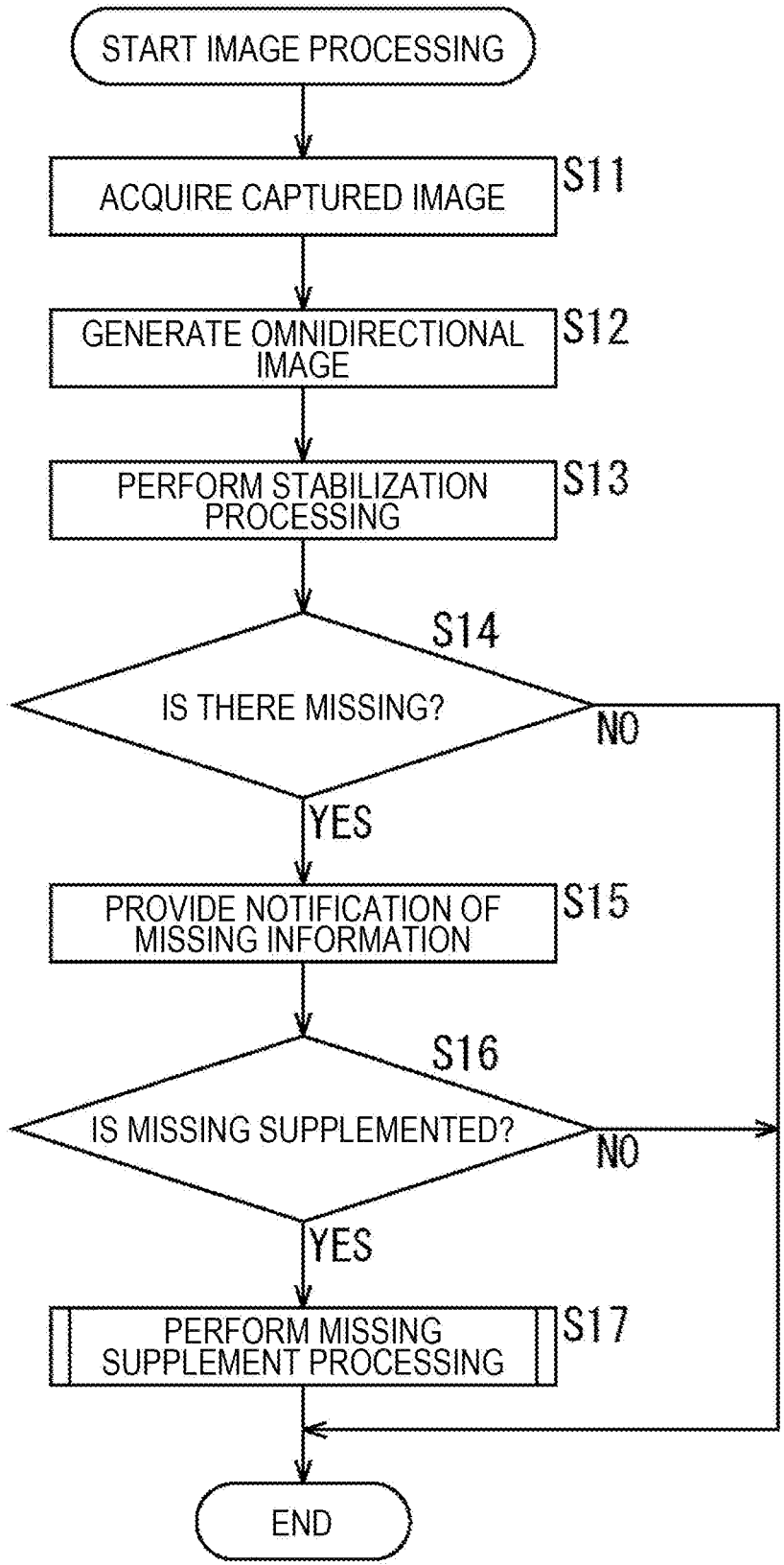
FIG. 16 is a flowchart for explaining image processing of the wearable terminal of FIG. 8.

Next, image processing of the wearable terminal 12 will be described with reference to the flowchart of FIG. 16.

In step S11, the image acquisition unit 65*a*-1 acquires the horizontally long image 131R from the camera 121R, and supplies data of the acquired image 131R to the image generation unit 61. The image acquisition unit 65*a*-2 acquires the vertically long image 131L from the camera 121L, and supplies data of the acquired image 131L to the image generation unit 61.

In step S12, the image generation unit 61 generates an omnidirectional image (and a rectangular image equivalent thereto) from each of the images acquired from the image acquisition units 65*a*-1 and 65*a*-2. The image generation unit 61 supplies the generated omnidirectional image to the image correction unit 63 and the data provision unit 66.

In step S13, the rotation operation unit 111 and the stabilized image generation unit 112 perform stabilization processing on the omnidirectional image generated by the image generation unit 61. In other words, the rotation operation unit 111 performs operation for correcting a change in the image accompanying the rotational motion of the headgear with camera 101, and supplies the operation value to the stabilized image generation unit 112. The stabilized image generation unit 112 performs stabilization processing for suppressing rotation by using the operation value from the rotation operation unit 111 to generate a stabilized image. The stabilized image generation unit 112 supplies the generated stabilized image to the missing determination unit 113 and the data provision unit 66.

The missing determination unit 113 determines whether or not there is a missing in the stabilized image (the image 171 in FIG. 13) from the stabilized image generation unit 112. Here, detection of a missing will be described in detail. Note that, although two are provided in the headgear with camera 101, a case where N camera images are stitched (sewn and synthesized) will be considered as an example.

The image generation unit 61 estimates N parameters (spatial positions and directions of the cameras) from each camera image, and performs conversion and synthesizing from each camera image into images on the omnidirectional image. At this time, estimation of the camera parameters includes a method of referring to the camera parameters thereafter once performed before photographing to perform synthesizing, and a method of estimating camera parameters in real time.

When the positional relationship of each of these camera parameter series C(n) is determined, the range that can be covered by the camera can be specified, so that the missing determination unit 113 determines presence or absence of a missing from the camera parameter series C(1 . . . N).

Alternatively, after performing synthesizing and conversion into the omnidirectional image, the missing determination unit 113 examines the change of the pixel in the omnidirectional image in the time direction. In a case where a missing is generated, since pixel data from the camera image is not provided, so that the pixel in the omnidirectional image does not change from the initial color state. The missing determination unit 113 detects the portion as a missing region (missing portion).

Any one of the above methods is used to detect a missing region.

In a case where it is determined in step S14 that there is a missing, the process proceeds to step S15. At this time, the missing determination unit 113 supplies the determination result on the presence or absence of a missing of the stabilized image, and information associated with the missing such as indication of the position of the missing portion, to the missing supplement processing unit 114 and the display control unit 51.

In step S15, the display control unit 51 controls the display of the missing information regarding the missing and notifies the user of the missing information. For example, although not illustrated, the wearable terminal 12 has a wristwatch-type display unit 23 and an operation unit 24, and is worn on a user's arm which is the moving object 30. At this time, on the display unit 23, display of suggestion of missing supplement processing is also controlled together with the missing information, and operation information from the operation unit 24 operated by the user is inputted via the operation information acquisition unit 65*b*.

In step S16, the missing supplement processing unit 114 determines whether or not the missing is supplemented. In a case where it is determined that in step S16 the missing is supplemented, the process proceeds to step S17.

In step S17, the missing supplement processing unit 114 performs missing supplement processing. Here, the stabilized image has the following features.

Figure 14:
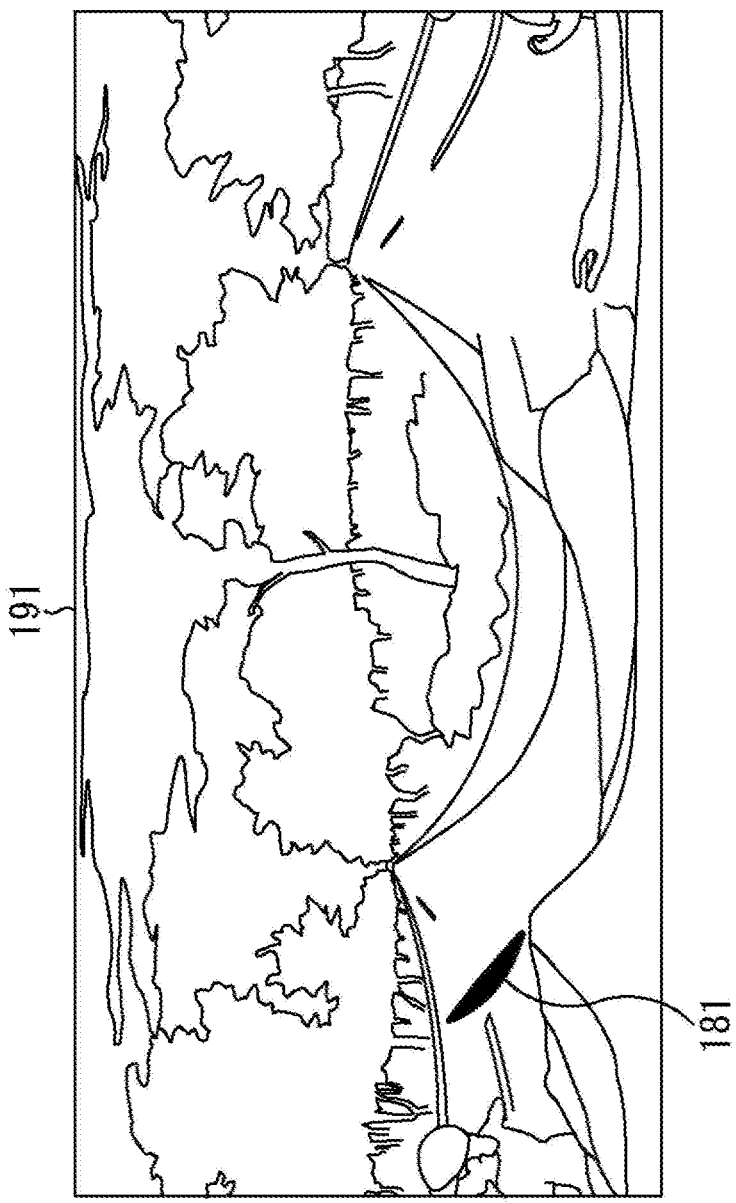
FIG. 14 is a diagram for explaining the nature of a missing.
Figure 15:
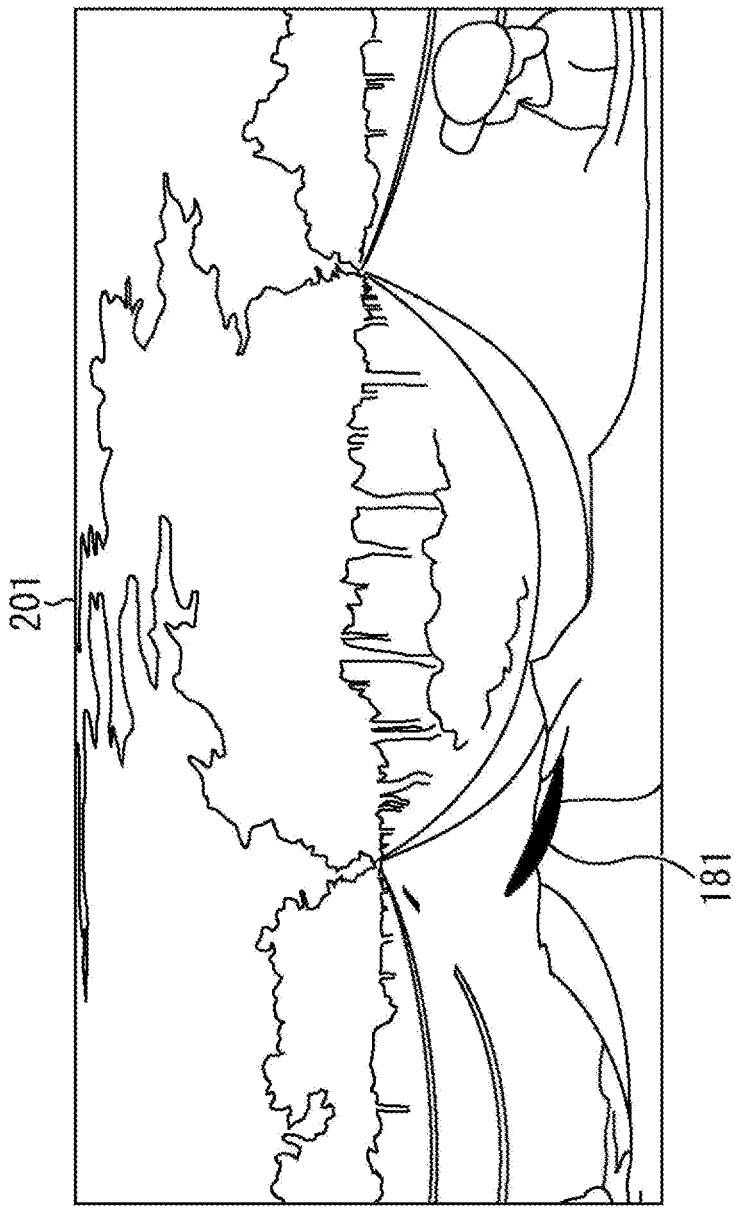
FIG. 15 is a diagram for explaining the nature of a missing.

In the example of FIG. 14, a stabilized image 191 having a missing portion 181 is shown, and in the example of FIG. 15, a stabilized image 201 having a missing portion 181 is shown. When FIG. 14 and FIG. 15 are compared, the spatial object does not move, but the missing portion 181 moves.

In other words, the stabilized image is a fixed image with respect to the environment including a stationary state. That is, the image itself does not change even if it varies according to the physical posture of the camera. On the other hand, in a case where an image missing is generated, in the image before stabilization, the missing portion does not move. However, after the stabilization processing is performed, the missing portion moves according to the physical posture of the camera.

The missing supplement processing unit 114 performs missing supplement processing using such a property. Specifically, the averaged image of the past frame image of the image of the format of the omnidirectional image (for example, the equirectangular projection) is held in the built-in memory (the storage unit 67 in FIG. 5). In a case where, in the missing supplement processing, the corresponding pixel is a missing region, the missing supplement processing unit 114 refers to and uses the pixel information held in the past frame.

Note that the frame for supplement using the past frame may be generated by a simple average image, supplement of the texture, supplement of the object image, and optical flow in the image.

Furthermore, in a case where a missing region is estimated, if the region itself is synthesized as a region interface, the joint becomes clear. Therefore, with respect to the missing region, as an example, after dilation (delay) processing is applied to the image, the pixel for supplement and the original pixel are a-blended at the region boundary, and thereby, the joint can be made smooth.

Figure 17:
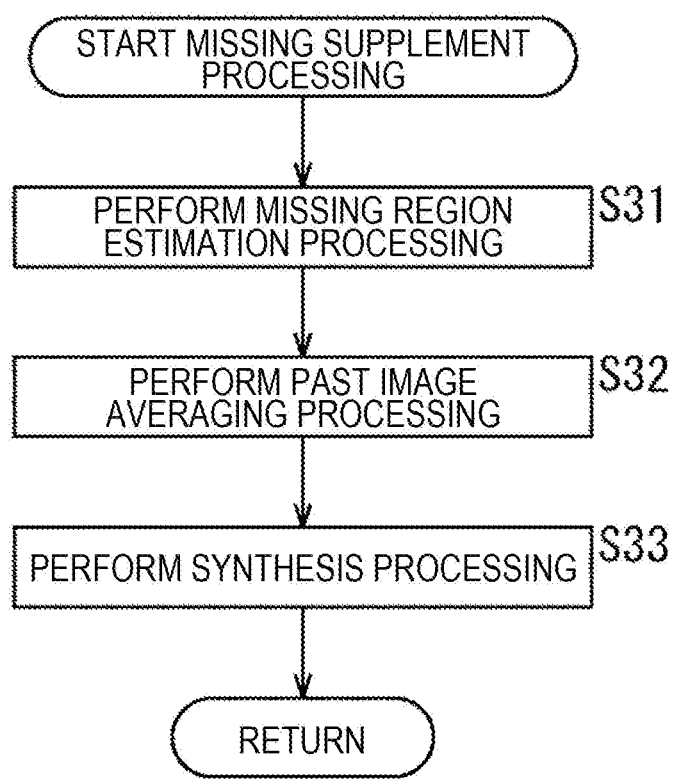
FIG. 17 is a flowchart for explaining missing supplement processing in step S17 in FIG. 16.

With respect to the above-described missing supplement processing, as will be described later with reference to FIG. 17, an image after missing supplement is generated by the processing of step S17. The missing supplement processing unit 114 supplies the image that has been missing-supplemented to the data provision unit 66. Thus, the image processing is terminated.

On the other hand, in a case where it is determined in step S14 that there is no missing, the determination result (no missing) is supplied to the missing supplement processing unit 114 and the display control unit 51, and the image processing is terminated. In this case, the stabilized image from the stabilized image generation unit 112 is transmitted from the data provision unit 66.

In a case where it is determined in step S16 that the missing is not supplemented, the image processing is terminated. In this case, for example, the stabilized image and the missing information from the stabilized image generation unit 112 are transmitted from the data provision unit 66.

Next, the missing supplement processing will be described with reference to the flowchart of FIG. 17. The missing supplement processing unit 114 performs missing region estimation in step S31. In the missing region estimation, for example, the same method as the missing detection described above is used.

The missing supplement processing unit 114 performs past image averaging processing of the estimated missing region in step S32. In step S33, the missing supplement processing unit 114 performs synthesis processing on the estimated missing region by using the averaged image averaged in step S32.

Figure 18:
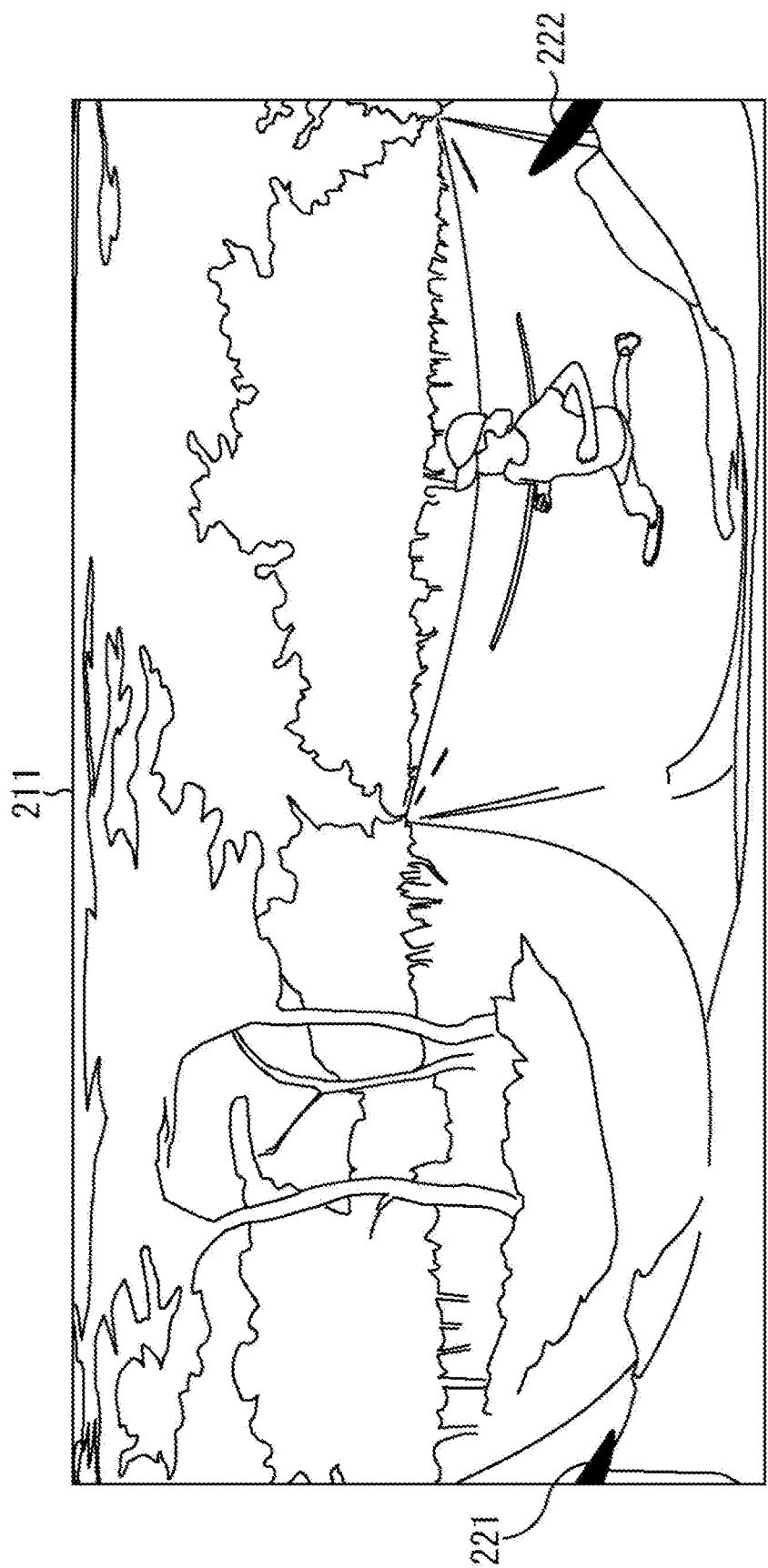
FIG. 18 is a diagram showing an example of an image before the missing supplement processing.
Figure 19:
FIG. 19 is a diagram showing an example of an image after the missing supplement processing.

Here, in the example of FIG. 18, a stabilized image 211 having missing portions 221 and 222 is shown, and in the example of FIG. 19, a stabilized image 231 in which a missing portion is supplemented is shown.

As described above, the missing region is estimated from the stabilized image 211 having the missing portions 221 and 222 as shown in FIG. 18, missing supplement is performed on the estimated missing region, and the stabilized image 231 having no missing as shown in FIG. 19 is acquired.

Note that the missing supplement data may be distributed as superimposed (layer) data together with the stabilized image so that it is possible to select whether the supplemented image is viewed or the non-supplemented image is viewed on the viewer side.

Control may be performed for whether or not the missing supplement processing described above is performed, depending on the size, shape, and number of the missing portions. For example, considered are examples in which the missing supplement processing is performed or parameters of processing for the missing supplement processing is changed, in a case where the size of the missing portion is larger than the predetermined size, a case where the shape is other than the predetermined shape, a case where the number is larger than the predetermined number, or the like.

Furthermore, the presence or absence of missing supplement processing may be performed over a network. In other words, a selection screen as to whether or not missing information or missing supplement processing should be performed is displayed on the display unit 23 of the server 11 or another wearable terminal 12 to perform notification, and in response to an instruction therefrom, missing supplement processing may be performed. Moreover, the missing supplement processing described above may be performed on the photographing side, the server, or another user side.

As described above, according to the present technology, it is possible to grasp a missing in an image before delivery. In addition, since it can be decided whether or not the missing supplement is performed, it is possible to perform a treatment according to the user's preference regarding a missing in an image.

Note that, in the above description, as notification to the user, an example in which display control of missing information of an image and suggestion of missing supplement processing has been described, but the method of notification is not limited to display, and missing information and suggestion of missing supplement processing may be voice controlled. Alternatively, in accordance with the operation of the user, the display of the region may be dynamically changed such that not only the missing portion but also the region subjected to the supplement processing is highlighted.

Note that, in the missing supplement processing described above, a desirable result cannot be acquired in a case where the object in the image is an animal body. Accordingly, after whether an animal body or a stationary object is detected, whether or not the processing is performed is determined, and then missing supplement processing may be performed only in a case where it is a stationary object, and missing supplement processing may be prohibited in a case of an animal body.

Furthermore, also in a case where a camera is moving intensely, a desirable result cannot be acquired for missing supplement processing. Accordingly, for example, it is determined whether or not the camera is translating faster than a predetermined moving speed, and missing supplement processing may be prohibited when the camera is translating faster than the predetermined moving speed, and missing supplement processing may be performed when the moving speed is slower than the predetermined moving speed. Note that, missing supplement processing may be performed if the motion of the camera is only rotation. The missing supplement processing of the present technology tends to be vulnerable to external environmental changes and translational motion.

Note that, the present technology is applied to a missing portion of an entire circumference captured image acquired by combining a plurality of images together to be stabilized as described above, but the present technology can be also applied to a missing portion generated due to the fact that the missing portion cannot be covered by the photographing range of the camera, for example.

Furthermore, the present technology can be applied also to a case where any of a plurality of cameras fails to acquire an image due to a breakdown or the like, by considering that as a missing.

Note that, the present technology can be applied to a camera having a part-fixing mechanism (rigit body) as the above-described headgear with camera 101, or a camera in which the positional relationship between cameras is flexible, and the stitching parameters are changed in real time to perform camera image synthesis.

Furthermore, in addition to the above, the present technology can also be applied to, for example, a plurality of cameras arranged in a vehicle capable of acquiring around view, a ball camera capable of photographing by being thrown up while being rotated, in which a plurality of cameras are arranged in a ball-shaped case, or the like. Furthermore, at least two of a side camera, a front camera, and a rear camera provided in a vehicle may be combined.

Note that the program executed by the computer may be a program of processing in chronological order according to the order described in the present specification or may be a program of processing in parallel or at a necessary stage such as when a call is made.

Furthermore, in the present specification, a step of describing a program to be recorded on a recording medium includes, in addition to processing that is performed in chronological order according to the described order, processing that is not processed in chronological order but is performed in parallel or individually.

Furthermore, in this specification, the term "system" refers to the entire device including a plurality of devices.

For example, in the present disclosure, it is possible to adopt a configuration of cloud computing in which one function is shared by a plurality of devices via a network, and is collaboratively processed.

Note that the program executed by the computer may be a program of processing in chronological order according to the order described in the present specification or may be a program of processing in parallel or at a necessary stage such as when a call is made.

Furthermore, in the present specification, a step of describing a program to be recorded on a recording medium includes, in addition to processing that is performed in chronological order according to the described order, processing that is not processed in chronological order but is performed in parallel or individually.

Furthermore, in this specification, the term "system" refers to the entire device including a plurality of devices.

For example, in the present disclosure, it is possible to adopt a configuration of cloud computing in which one function is shared by a plurality of devices via a network, and is collaboratively processed.

Furthermore, in the above, the configuration described as one device (or processing unit) may be divided and configured as a plurality of devices (or processing units). On the contrary, in the above, the configuration described as a plurality of devices (or processing units) may be integrated and configured as one device (or processing unit). Furthermore, configurations other than those described above, of course, may be added to the configuration of each device (or each processing unit). Moreover, when the configuration and operation of the system as a whole are substantially the same, a part of the configuration of a certain device (or processing unit) may be included in the configuration of another device (or another processing unit). That is, the present technology is not limited to the above-described embodiments, and various modifications are possible without departing from the gist of the present technology.

While preferred embodiment of the present disclosure has been described in detail with reference to the accompanying drawings, the disclosure is not limited to such examples. It is obvious that various variations and modifications can be conceived within the scope of the technical idea described in the claims by a person having ordinary knowledge in the field of technology to which the present disclosure belongs, and, of course, it is understood that these variations and modifications belong to the technical scope of present disclosure.

Note that, the present technology can adopt the following configuration.

(1) An information processing apparatus including:
a missing determination unit that determines presence or absence of missing in an image generated by imaging by a plurality of imaging devices; and
a notification control unit that controls notification according to a determination result of presence or absence of the missing by the missing determination unit.

(2) The information processing apparatus described in above (1), in which
the notification control unit controls the notification display of the determination result on the presence or absence of the missing.

(3) The information processing apparatus described in above (2), in which
in a case where it is determined that there is a missing, the notification control unit causes highlight display of the missing.

(4) The information processing apparatus described in above (3), in which
the missing determination unit acquires a stabilized image in which a change in the image according to a posture change of the imaging device is suppressed, and
the notification control unit dynamically changes a position of the highlight display of the missing in the stabilized image.

(5) The information processing apparatus described in above (1), in which
in a case where it is determined that there is a missing, the notification control unit controls the notification of at least one of a size, a shape, or the number of pieces of the missing.

(6) The information processing apparatus described in above (1) or (5), in which
in a case where it is determined that there is the missing, the notification control unit controls the notification for selecting whether or not the missing is supplemented.

(7) The information processing apparatus described in any of above (1) to (6), in which
the plurality of imaging devices are a first wearable camera and a second wearable camera.

(8) The information processing apparatus described in above (7), in which
a longitudinal direction of a first image acquired by the first wearable camera and a longitudinal direction of a second image acquired by the second wearable camera intersect with each other.

(9) The information processing apparatus described in above (8), in which
a central region of the first image is arranged corresponding to a line-of-sight direction of a user wearing the information processing apparatus.

(10) The information processing apparatus described in above (8), in which
both end portions of the longitudinal direction of the first image are respectively connected to both end portions of the second image extending along the longitudinal direction of the second image.

(11) The information processing apparatus described in any of above (1) to (10) further including a missing supplement processing unit that performs supplement processing of the missing in a case where it is determined that there is the missing, in accordance with operation by a user.

(12) The information processing apparatus described in above (8), in which the notification control unit causes highlight display of a region of the image for which the missing supplement processing has been performed, in accordance with the operation by the user.

(13) The information processing apparatus described in above (11), in which the user is a user of another information processing apparatus connected via a network.

(14) The information processing apparatus described in any of above (1) to (13), further including a transmission unit that transmits a determination result on presence or absence of the missing via a network.

(15) The information processing apparatus described in above (14), in which in a case where it is determined that there is the missing, the transmission unit transmits missing information of at least one of a size, a shape, or the number of pieces of the missing as metadata via the network.

(16) An information processing method in which an information processing apparatus determines presence or absence of a missing in an image generated by imaging by a plurality of imaging devices, and controls notification according to a determination result of presence or absence of the missing.

(17) A program that causes a computer to function as: a missing determination unit that determines presence or absence of a missing in an image generated by imaging by a plurality of imaging devices; and a notification control unit that controls notification according to a determination result of presence or absence of the missing by the missing determination unit.

REFERENCE SIGNS LIST

10 System
11 Server
12 Wearable terminal (client device)
20 Apparatus
26 Imaging unit
27 Sensor
30 Moving object
50 Information processing apparatus
51 Display control unit
61 Image generation unit
63 Image correction unit
65 Data acquisition unit
65a-1 to 65a-5 Image acquisition unit
65b Operation information acquisition unit
66 Data provision unit
82 User
101 Gear with camera head
102 Information processing apparatus
111 Rotation operation unit
112 Stabilized image generation unit
113 Missing determination unit
114 Missing supplement processing unit
121L, 121R Camera

The invention claimed is:

1. An information processing apparatus comprising:
a missing portion determination unit configured to determine presence or absence of a missing portion in an image generated by imaging by a plurality of imaging devices; and
a notification control unit configured to control notification according to a determination result of presence or absence of the missing portion by the missing portion determination unit,
wherein, when it is determined that there is the missing portion, the notification control unit controls the notification by transmitting the missing portion as superimposed layer data,
wherein the notification includes a selection screen for selecting whether or not the superimposed layer data is displayed with the image, and
wherein the missing portion determination unit and the notification control unit are each implemented via at least one processor.

2. The information processing apparatus according to claim 1, wherein
the notification control unit controls the notification display of the determination result on the presence or absence of the missing portion.

3. The information processing apparatus according to claim 2, wherein,
when it is determined that there is the missing portion, the notification control unit causes highlight display of the missing portion.

4. The information processing apparatus according to claim 3, wherein
the missing determination unit acquires a stabilized image in which a change in the image according to a posture change of the imaging device is suppressed, and
the notification control unit dynamically changes a position of the highlight display of the missing portion in the stabilized image.

5. The information processing apparatus according to claim 1, wherein
when it is determined that there is a missing, the notification control unit controls the notification of at least one of a size, a shape, or a number of pieces of the missing portion.

6. The information processing apparatus according to claim 1, wherein
when it is determined that there is the missing portion, the notification control unit controls the notification for selecting whether or not the missing portion is supplemented.

7. The information processing apparatus according to claim 1, wherein
the plurality of imaging devices comprise a first wearable camera and a second wearable camera.

8. The information processing apparatus according to claim 7, wherein
a longitudinal direction of a first image acquired by the first wearable camera and a longitudinal direction of a second image acquired by the second wearable camera intersect with each other.

9. The information processing apparatus according to claim 8, wherein
a central region of the first image is arranged corresponding to a line-of-sight direction of a user wearing the information processing apparatus.

10. The information processing apparatus according to claim 8, wherein both end portions of the longitudinal direction of the first image are respectively connected to both end portions of the second image extending along the longitudinal direction of the second image.

11. The information processing apparatus according to claim 1, further comprising:
a missing portion supplement processing unit configured to perform supplement processing of the missing portion in a case where it is determined that there is the missing portion, in accordance with an operation by a user,
wherein the missing portion supplemented processing unit is implemented via at least one processor.

12. The information processing apparatus according to claim 11, wherein
the notification control unit causes highlight display of a region of the image for which the missing portion supplement processing has been performed, in accordance with the operation by the user.

13. The information processing apparatus according to claim 11, wherein
the user uses another information processing apparatus connected via a network.

14. The information processing apparatus according to claim 1, further comprising:
a transmission unit configured to transmit a determination result on presence or absence of the missing portion via a network,
wherein the transmission unit is implemented via at least one processor.

15. The information processing apparatus according to claim 14, wherein, in a case where it is determined that there is the missing portion, the transmission unit transmits missing information of at least one of a size, a shape, or a number of pieces of the missing portion as metadata via the network.

16. An information processing method, executed by an information processing apparatus, the method comprising:
determining presence or absence of a missing portion in an image generated by imaging by a plurality of imaging devices; and
controlling notification according to a determination result of presence or absence of the missing portion,
wherein, when it is determined that there is the missing portion, the notification is controlled by transmitting the missing portion as superimposed layer data, and
wherein the notification includes a selection screen for selecting whether or not the superimposed layer data is displayed with the image.

17. A non-transitory computer-readable storage medium having embodied thereon a program, which when executed by a computer causes the computer to execute a method, the method comprising:
determining presence or absence of a missing portion in an image generated by imaging by a plurality of imaging devices; and
controlling notification according to a determination result of presence or absence of the missing portion,
wherein, when it is determined that there is the missing portion, the notification is controlled by transmitting the missing portion as superimposed layer data, and
wherein the notification includes a selection screen for selecting whether or not the superimposed layer data is displayed with the image.

\* \* \* \* \*